United States Patent
Banach et al.

(10) Patent No.: US 11,663,724 B2
(45) Date of Patent: May 30, 2023

(54) METHOD AND APPARATUS FOR PROCESSING AN IMAGE OF A ROAD TO IDENTIFY A REGION OF THE IMAGE WHICH REPRESENTS AN UNOCCUPIED AREA OF THE ROAD

(71) Applicant: APTIV TECHNOLOGIES LIMITED, Dublin (IE)

(72) Inventors: Marzena Banach, Puszczykowo (PL); Piotr Bogacki, Cracow (PL); Rafal Dlugosz, Lubon (PL); Waldemar Dworakowski, Cracow (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/942,428

(22) Filed: Sep. 12, 2022

(65) Prior Publication Data

US 2023/0084189 A1  Mar. 16, 2023

(30) Foreign Application Priority Data

Sep. 10, 2021 (EP) ..................... 21195987

(51) Int. Cl.
  *G06T 7/12* (2017.01)
  *G06T 3/40* (2006.01)
  (Continued)

(52) U.S. Cl.
  CPC ............ *G06T 7/12* (2017.01); *G06T 3/4084* (2013.01); *G06T 5/20* (2013.01); *G06T 7/11* (2017.01);
  (Continued)

(58) Field of Classification Search
  CPC ........... G06T 7/168; G06T 2207/20064; G06T 2207/30236; G06T 2207/30248–30264;
  (Continued)

(56) References Cited

U.S. PATENT DOCUMENTS 6,292,583 B1 * 9/2001 Maruo ............... G06T 7/13
                                                                   382/248
2019/0187718 A1 * 6/2019 Zou ............... G06V 30/194

FOREIGN PATENT DOCUMENTS

CN          112991359 A  *  6/2021

OTHER PUBLICATIONS

Banach, Marzena, and Ratal Dlugosz. "Multi-Rate Signal Processing with the Use of Filter Banks Composed of Parallel FIR Filters." 2019 IEEE 31st International Conference on Microelectronics (MIEL). IEEE, 2019. (Year: 2019).*

Berry, Brett. "Top 10 Secrets of Pascal's Triangle." Math Hacks. Jun. 19, 2017, medium.com/i-math/top-10-secrets-of-pascals-triangle-6012ba9c5e23. Accessed Nov. 2, 2022. (Year: 2017).*

(Continued)

*Primary Examiner* — Geoffrey E Summers
(74) *Attorney, Agent, or Firm* — Carter, DeLuca & Farrell LLP; George Likourezos

(57) ABSTRACT

A method of processing an image of a scene including a road acquired by a vehicle-mounted camera to generate boundary data indicative of a boundary of an image region which represents an unoccupied area of the road, comprising: generating an LL sub-band image of an $N^{th}$ level of an (N+1)-level discrete wavelet transform, DWT, decomposition of the image by iteratively low-pass filtering and down-sampling the image N times, where N is an integer equal to or greater than one; generating a sub-band image of an $(N+1)^{th}$ level by high-pass filtering the LL sub-band image of the $N^{th}$ level, and down-sampling a result of the high-pass filtering, such that the sub-band image of the $(N+1)^{th}$ level has a pixel region having substantially equal pixel values representing the unoccupied area of the road in the image; and generating the boundary data by determining a boundary of the pixel region.

14 Claims, 14 Drawing Sheets

(51) Int. Cl.
  *G06T 5/20* (2006.01)
  *G06V 10/52* (2022.01)
  *G06T 7/11* (2017.01)
  *G06V 20/56* (2022.01)

(52) U.S. Cl.
  CPC .... *G06V 10/52* (2022.01); *G06T 2207/20064* (2013.01); *G06T 2207/30256* (2013.01); *G06V 20/588* (2022.01)

(58) Field of Classification Search
  CPC ..... G06T 7/10; G06T 7/11; G06T 7/12; G06T 7/136; G06T 7/181; G06T 7/187; G06T 7/194; G06T 3/4084; G06T 5/20; G06V 20/56–588; G06V 10/52; G06V 30/189; G06K 9/00
  See application file for complete search history.

(56) References Cited

OTHER PUBLICATIONS

Zhang, Dengsheng. "Wavelet transform." Fundamentals of image data mining. Springer, Cham, 2019. 35-44. (Year: 2019).*
Treil, Nicolas, Stephane Mallat, and Ruzena Bajcsy. "Image Wavelet Decomposition and Applications." Technical Reports (CIS) (1989): 781. (Year: 1989).*
Glasbey, C. A. and G. W. Horgan, Image Analysis for the Biological Sciences, 1994, ch. 4. (Year: 1994).*
Jose M. Alvarez, et al., "Road Scene Segmentation from a Single Lane", Springer-Verlag Berlin Heidelberg, vol. 28, pp. 1-14, 2012.
European Search Report issued by the European Patent Office in connection with International Application No. 21195987.9, dated Mar. 10, 2022.

* cited by examiner $F = 1 : [1\ 1] / 2^F$
$F = 2 : [1\ 2\ 1] / 2^F$
$F = 3 : [1\ 3\ 3\ 1] / 2^F$
$F = 4 : [1\ 4\ 6\ 4\ 1] / 2^F$
$F = 5 : [1\ 5\ 10\ 10\ 5\ 1] / 2^F$
$F = 6 : [1\ 6\ 15\ 20\ 15\ 6\ 1] / 2^F$
$F = 7 : [1\ 7\ 21\ 35\ 35\ 21\ 7\ 1] / 2^F$

METHOD AND APPARATUS FOR PROCESSING AN IMAGE OF A ROAD TO IDENTIFY A REGION OF THE IMAGE WHICH REPRESENTS AN UNOCCUPIED AREA OF THE ROAD

CROSS-REFERENCE TO RELATED APPLICATION

This application claims the benefit of European patent application serial number EP21195987.9 filed on Sep. 10, 2021. The entire contents of which are hereby incorporated by reference herein.

TECHNICAL FIELD

Example aspects herein generally relate to the field of image processing and, more particularly, to the processing of digital images acquired by a vehicle-mounted camera.

BACKGROUND

The capability to detect an area of a road that is unoccupied by vehicles or other objects is useful in many active safety (AS) technologies. The detection of road occupancy lies at the heart of many active safety functions, such as lateral control (LC) and lane change assist (LCA), for example. Furthermore, the detection of lanes via road markers such as Botts' dots (BDs), is used in many active safety functions such as lane departure warning (LDW), traffic jam assist (TJA), and adaptive cruise control (ACC). Equipping vehicles with the LDW function is currently a requirement, for example, during the Euro New Car Assessment Program (NCAP) tests. Over the past few years, there has been a great desire to develop these technologies.

SUMMARY

The present inventors have devised a method for processing an image of road, which has been acquired by a vehicle-mounted camera, to generate boundary data indicative of a boundary of a region of the image which represents an unoccupied area of the road. The method can allow the boundary to be detected in a computationally efficient way, and has been found to be capable of reliably determining the boundary in images acquired at different times of day that have widely varying lighting and contrast conditions.

More particularly, the present inventors have devised, in accordance with a first aspect herein, a method of processing an image of a scene including a road that has been acquired by a camera mounted on a vehicle to generate boundary data indicative of a boundary of a region of the image which represents an unoccupied area of the road. The method comprises generating an LL sub-band image of an $N^{th}$ level of an (N+1)-level DWT decomposition of the image by performing an iterative process of iteratively low-pass filtering and down-sampling the image N times, where N is an integer equal to or greater than one. The method further comprises generating a sub-band image of an $(N+1)^{th}$ level of the (N+1) level DWT decomposition of the image by high-pass filtering the LL sub-band image of the $N^{th}$ level, and down-sampling a result of the high-pass filtering, such that the sub-band image of the $(N+1)^{th}$ level has a region of pixels having substantially equal pixel values, which represents the unoccupied area of the road in the image. The method further comprises generating the boundary data by determining a boundary of the region of pixels.

A first low-pass filter having a first sequence of filter coefficients that are symmetrical may be used in at least one iteration of the iterative process. Furthermore, the filter coefficients in the first sequence of filter coefficients may be set to values in a row of Pascal's triangle having the same number of values as an order of the first low-pass filter.

The high-pass filtering used to generate the sub-band image of the $(N+1)^{th}$ level may comprise applying a high-pass filter having a second sequence of filter coefficients that are symmetrical. In this case, alternate filter coefficients in the second sequence of filter coefficients may be set to correspondingly located values in a row of Pascal's triangle having the same number of values as an order of the high-pass filter, with each remaining filter coefficient in the second sequence of filter coefficients being set to a value obtained by multiplying a correspondingly located value in the row of Pascal's triangle by $-1$. The sub-band image of the $(N+1)^{th}$ level of the (N+1)-level DWT decomposition may be one of an LH sub-band image, an HL sub-band image, and an HH sub-band image.

In an embodiment, generating the sub-band image of the $(N+1)^{th}$ level of the (N+1)-level DWT decomposition of the image may comprise generating an LH sub-band image of the $(N+1)^{th}$ level of the (N+1)-level DWT decomposition of the image by: generating a low-pass filtered LL sub-band image by applying a row kernel which defines a low-pass filter across the rows of the LL sub-band image of the $N^{th}$ level of the (N+1)-level DWT decomposition of the image; down-sampling the columns of the low-pass filtered LL sub-band image by a factor of two to generate a down-sampled sub-band image; generating a high-pass filtered LL sub-band image by applying a column kernel which defines a high-pass filter across the columns of the down-sampled sub-band image; and down-sampling the rows of the high-pass filtered LL sub-band image by a factor of two to generate the LH sub-band image of the $(N+1)^{th}$ level.

In first variant of the embodiment, generating the sub-band image of the $(N+1)^{th}$ level of the (N+1)-level DWT decomposition of the image may comprise generating an LH sub-band image of the $(N+1)^{th}$ level of the DWT decomposition of the image by: generating a high-pass filtered LL sub-band image by applying a column kernel which defines a high-pass filter across the columns of the LL sub-band image of the $N^{th}$ level; down-sampling the rows of the high-pass filtered LL sub-band image by a factor of two to generate a down-sampled sub-band image; generating a low-pass filtered sub-band image by applying a row kernel which defines a low-pass filter across the rows of the down-sampled sub-band image of the $N^{th}$ level; and down-sampling the columns of the low-pass filtered sub-band image by a factor of two to generate the LH sub-band image of the $(N+1)^{th}$ level.

In a second variant of the embodiment, generating the sub-band image of the $(N+1)^{th}$ level may comprise generating an LH sub-band image of the $(N+1)^{th}$ level of the (N+1)-level DWT decomposition of the image by: generating a filtered sub-band image by applying a two-dimensional kernel across the LL sub-band image of the Nth level, the two-dimensional kernel being separable into a product of a row kernel and a column kernel, the row-kernel defining a low-pass filter and the column kernel defining a high pass filter; and down-sampling rows and the columns of the filtered sub-band image by a factor of two.

The low-pass filter and the high-pass filter used to generate the LH sub-band image of the $(N+1)^{th}$ level of the (N+1)-level DWT decomposition of the image in the embodiment and the variants thereof set out above may define a quadrature mirror filter pair. Furthermore, the low-pass filter used to generate the LH sub-band image of the $(N+1)^{th}$ level of the (N+1)-level DWT decomposition of the image may have a third sequence of filter coefficients that are symmetrical. In addition, the filter coefficients in the third sequence of filter coefficients may be set to values in a row of Pascal's triangle having the same number of values as an order of the low-pass filter used to generate the LH sub-band image of the $(N+1)^{th}$ level of the (N+1)-level DWT decomposition of the image.

The method of the first aspect or any of its embodiments set out above may be used to process an image of the scene as acquired by the camera, with no pre-processing of the image as acquired by the camera being performed. Furthermore, parameter N may be an integer greater than or equal to four, and may be set to a value that is based on an image resolution of the image, by using a predetermined mapping between values of the image resolution and values of N.

The boundary data may be generated by determining the boundary of the region of the sub-band image by: determining, for each of a plurality of columns of pixels in the sub-band image, a pixel location of a pixel in the column at which a difference between a pixel value of the pixel and a pixel value of an adjacent pixel in the column exceeds a predetermined threshold; and defining line segments in the sub-band image using the determined pixel locations, the line segments defining the boundary of region of the sub-band image. A pixel location of a pixel in the column, at which a difference between a pixel value of the pixel and a pixel value of an adjacent pixel which is above the pixel in the column exceeds a predetermined threshold, may be determined for each of the plurality of columns of pixels in the sub-band image by evaluating the difference for successive pixels in the column, starting from a pixel at a bottom of the column.

The camera may be configured to acquire, as the image, an image of a scene including the road and a portion of the sky, and the method may exclude from the processing a portion of the image representing the portion of the sky.

In the foregoing, a scaling factor may be applied to the pixel value of each pixel of the sub-band image to increase a contrast between the pixels of the region and pixels adjacent to the region, before generating the boundary data.

In embodiments where N is an integer equal to or greater than two, the method may further comprise generating refined boundary data, which is indicative of the boundary of the region of the image which represents the unoccupied area of the road, by: high-pass filtering an LL sub-band image of a $P^{th}$ level of the (N+1)-level DWT decomposition of the image and down-sampling a result of the high-pass filtering of the LL sub-band image of the $P^{th}$ level to generate a second sub-band image which is a sub-band image of a $(P+1)^{th}$ level of the (N+1)-level DWT decomposition of the image, where P is an integer smaller than N; determining a second boundary, in the second sub-band image, by up-scaling the determined boundary of the region of the sub-band image of the $(N+1)^{th}$ level using a scaling factor of $2^T$, where T=N−P, to generate an up-scaled boundary, and mapping the up-scaled boundary to the second sub-band image; and processing the second sub-band image using the determined second boundary to generate, as the refined boundary data, data indicative of a boundary of a second region in the second sub-band image which contains the second boundary and represents the unoccupied area of the road in the image.

The data indicative of the boundary of the second region may be generated by expanding the determined second boundary to further bound at least one region in the second sub-band image which is defined by adjacent pixels having substantially equal pixel values.

The data indicative of the boundary of the second region may be generated by: determining a cluster of adjacent pixels in the second sub-band image which crosses the second boundary, the pixels in the cluster having substantially equal pixel values; generating image data of an up-scaled sub-band image having the same image size as the second sub-band image, by up-scaling a portion of the sub-band image of the $(N+1)^{th}$ level by the scaling factor of $2^T$, wherein the portion of the sub-band image of the $(N+1)^{th}$ that is up-scaled is determined based on the locations of the pixels of the cluster in the second sub-band image, and a mapping between a location of each pixel of the second sub-band image with a location of a pixel of sub-band image of the $(N+1)^{th}$ level; evaluating a statistic of pixels in the up-scaled portion of the sub-band image of the $(N+1)^{th}$ level, and comparing the evaluated statistic with a predetermined value; and determining, based on the comparison between the evaluated statistic and the predetermined value, whether to expand the second boundary to further bound the cluster of adjacent pixels in the second sub-band image.

In the foregoing, one or more of the following may be evaluated as the statistic of the pixels in the up-scaled portion of the sub-band image of the $(N+1)^{th}$ level: a proportion of pixels in the up-scaled portion of the sub-band image of the $(N+1)^{th}$ level whose pixel values are below a second predetermined value; a mean of pixel values in the up-scaled portion of the sub-band image of the $(N+1)^{th}$ level; and a variance of pixel values in the up-scaled portion of the sub-band image of the $(N+1)^{th}$ level.

In the foregoing, a binary thresholding operation may be applied to the second sub-band image before generating the refined boundary data. Furthermore, a scaling factor may be applied to the pixel value of each pixel of the second sub-band image before the refined boundary data is generated.

In the foregoing, the camera may be configured to acquire, as the image, an image of a scene including the road and a horizon, and the determination of whether to expand the second boundary to further bound the cluster of adjacent pixels in the second sub-band image may further be based on a distance of the cluster from the horizon in the second sub-band image.

Additionally or alternatively, the camera may be configured to generate a distorted image of the scene, and an occupancy map data indicative of an occupancy map of the road may be generated by applying a distortion correction to the refined boundary data.

In embodiments where N is an integer equal to or greater than two, and the road in the scene has a road marker, the method may further comprise generating boundary data indicative of a boundary of a road marker region of the image which represents the road marker, by: high-pass filtering an LL sub-band image of a $M^{th}$ level of the (N+1)-level DWT decomposition of the image and down-sampling a result of the high-pass filtering of the LL sub-band image of the $M^{th}$ level to generate a sub-band image of a $(M+1)^{th}$ level of the DWT decomposition, M being an integer less than N; determining a search area in the sub-band image of the $(M+1)^{th}$ level by up-scaling the boundary determined from the sub-band image of the (N+1)$^{th}$ level by a factor of $2^D$ for D=N−M, and mapping the up-scaled boundary to the sub-band image of the $(M+1)^{th}$ level, wherein the search area lies within the up-scaled boundary that is mapped onto the sub-band image of the (M+1)$^{th}$ level; and determining, within the search area in the sub-band image of the (M+1)$^{th}$ level, a boundary of a second region of pixels of the sub-band image of the (M+1)$^{th}$ level, the second region of pixels being surrounded by pixels having pixel values that are substantially different to the pixel values of the pixels in the second region, the boundary of the second region being indicative of the boundary of the road marker region in the image.

The LL sub-band image of the M$^{th}$ level of the (N+1)-level DWT decomposition of the image may be generated using at least one first low-pass filter having a first sequence of filter coefficients that are symmetrical and set to values in a row of Pascal's triangle having the same number of values as an order of the first low-pass filter.

The high-pass filtering used to generate the sub-band image of the (M+1)$^{th}$ level of the (N+1)-level DWT decomposition of the image may apply a high-pass filter having a second sequence of filter coefficients that are symmetrical, wherein alternate filter coefficients in the second sequence of filter coefficients of the high-pass filter are set to correspondingly located values in a row of Pascal's triangle having the same number of values as an order of the high-pass filter, with each remaining filter coefficient in the second sequence of filter coefficients being set to a value obtained by multiplying a correspondingly located value in the row of Pascal's triangle by −1.

The sub-band image of the (M+1)$^{th}$ level of the (N+1)-level DWT decomposition may be one of an LH sub-band image, an HL sub-band image, and an HH sub-band image. The road marker may be a Botts' dot, and the sub-band image of the (M+1)$^{th}$ level of the (N+1)-level DWT decomposition may be an LH sub-band image of the (M+1)$^{th}$ level of the (N+1)-level DWT decomposition.

The boundary data may be generated by: determining, within the search area, a pixel location of a pixel whose pixel value exceeds a predetermined threshold; executing a contour tracing algorithm using the determined pixel location in the search area to identify a boundary of the second region of pixels, wherein the boundary separates pixels of the second region which are adjacent to the boundary and have pixel values above the predetermined threshold, from pixels outside the second region which are adjacent to the boundary and have pixel values below the predetermined threshold.

A boundary of the road marker region in the image may be defined by up-scaling the boundary of the second region of pixels by a factor of $2^{M+1}$ to generate a second up-scaled boundary, and mapping the second up-scaled boundary to the image.

The method may further comprise determining whether a portion of the image within the defined boundary of the road marker region represents the road marker on the road either by correlating the portion of the image within the defined boundary of the road marker region with one with more stored images of a road marking, or by using a trained statistical classifier.

In addition, the present inventors have devised, in accordance with a second aspect herein, a computer program comprising computer-readable instructions which, when executed by a processor, cause the processor to execute the method of the first aspect or any of its embodiments as set out above.

Furthermore, the present inventors have devised, in accordance with a third aspect herein, an apparatus for processing an image of a scene including a road that has been acquired by a vehicle-mounted camera to generate boundary data indicative of a boundary of a region of the image which represents an unoccupied area of the road. The apparatus comprises a discrete wavelet transform, DWT, decomposition module arranged to generate an LL sub-band image of an N$^{th}$ level of an (N+1)-level discrete wavelet transform, DWT, decomposition of the image by iteratively low-pass filtering and down-sampling the image N times, where N is an integer equal to or greater than one. The DWT decomposition module is further arranged to generate a sub-band image of an (N+1)$^{th}$ level of the (N+1) level DWT decomposition of the image by high-pass filtering the LL sub-band image of the N$^{th}$ level, and down-sampling a result of the high-pass filtering, such that the sub-band image of the (N+1)$^{th}$ level has a region of pixels having substantially equal pixel values, which represents the unoccupied area of the road in the image. Moreover, the apparatus further comprises a boundary data generator module arranged to generate the boundary data by determining a boundary of the region of pixels.

BRIEF DESCRIPTION OF THE DRAWINGS

Embodiments will now be explained in detail, by way of non-limiting example only, with reference to the accompanying figures described below. Like reference numerals appearing in different ones of the figures can denote identical or functionally similar elements, unless indicated otherwise.

FIG. 5 illustrates examples of low-pass filters and high-pass filters of different filter orders used in the embodiment, which have filter coefficients set in accordance with values in a row of Pascal's triangle.

DESCRIPTION OF EMBODIMENTS

Figure 1:
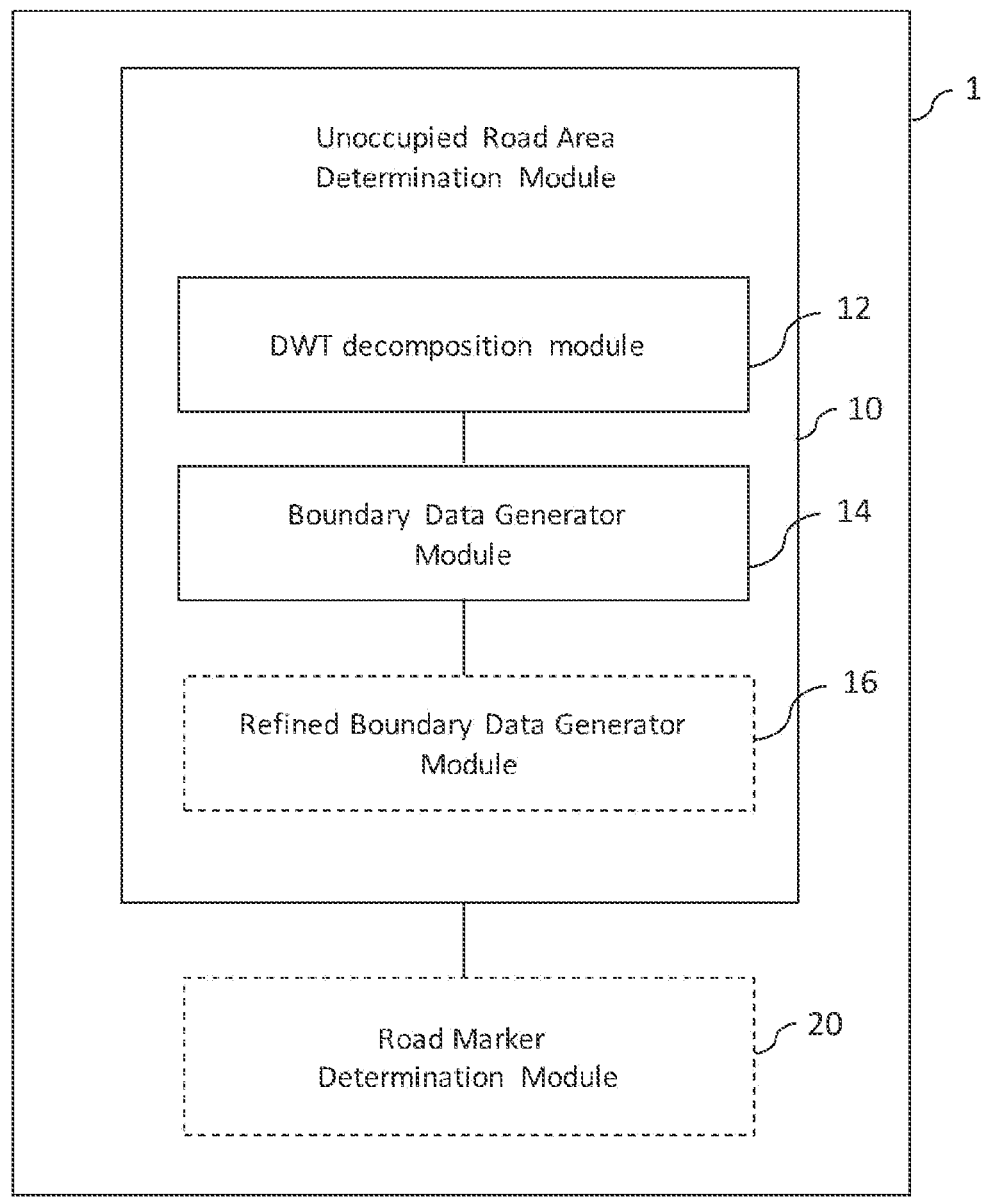
FIG. 1 is a schematic illustration of an apparatus for processing images captured by a vehicle-mounted camera, in accordance with an embodiment.

The image processing method described herein is based on the discrete wavelet transform (DWT), by which an image can be decomposed into its composite frequency components for analysis. In a typical application of DWT for image processing, after computing the DWT of an input image, a reconstruction phase is employed to reconstruct original image. To reconstruct the original signal (or a denoised version of the original signal, if image denoising is carried out on the sub-band images before the reconstruction phase), orthogonal filter banks comprising orthogonal filters corresponding to orthogonal wavelets are required. However, implementing orthogonal filter banks using orthogonal wavelets, such as those derived from the Daubechies wavelet, for example, makes the DWT decomposition process computationally expensive, due to the presence of the complex filter coefficients that are required to implement these filters. This can be problematic in real-time image recognition systems, in which processing power is often limited and high-speed feature detection is required.

The image processing method herein includes some modifications to the DWT approach set out above, which are made possible by properties of the image being processed, and which allow simplifications and consequent advantages set out above to be attained.

More particularly, the inventors have found that, in DWT sub-band images that are generated by the action of at least one high-pass filter, low spatial frequency components of the input image, which correspond to an unoccupied area of the road in the image, can be effectively removed, leaving in its place a substantially dark region of the sub-band image whose boundary can be easily demarcated using the boundary-finding algorithms described herein. The removal of these low-frequency components can enhance the contrast regardless of the lighting conditions under which the image was captured by the camera. The combination of image processing operations describe herein can make the overall procedure robust against varying noise and lighting conditions.

As no reconstruction of the original signal is required in the image processing method described herein, it is unnecessary to ensure orthogonality of the analysis filter bank. This allows greater freedom in selecting the structures of the filters and, in particular, allows the DWT decomposition to be implemented using symmetrical, integer-valued filters, which facilitates an efficient, low-complexity implementation in hardware. Further, in some embodiments, the filters used to generate the sub-band images of the DWT decomposition are designed from the values in a row of Pascal's triangle. Such filters, which have a simple filter structure and a flat frequency response, have been found by the inventors to be well-suited for extraction of low-frequency components associated with the unoccupied areas of the road in the original image.

Furthermore, not all sub-bands of the multi-level DWT decomposition process need to be computed at each level of the DWT decomposition. Instead, to determine the boundary of the unoccupied area of the road, one sub-band image from each level of the DWT decomposition needs to be computed, thereby significantly reducing the complexity of the search process.

FIG. 1 is a schematic illustration of an apparatus 1 for processing an image acquired by a vehicle-mounted camera, according to an embodiment. The apparatus 1 comprises an unoccupied road area determination module 10 and may, as in the present embodiment, further comprise a road marker determination module 20 and a vehicle-speed determination module 30.

The unoccupied road area determination module 10 is arranged to process an image of a scene including a road, which has been captured by the vehicle-mounted camera, to generate boundary data that is indicative of a boundary of a region of the captured image which represents an unoccupied area of the road. The captured image may, as in the present embodiment, be a greyscale image. The image processing techniques described in the following may, however, be used to process one or more colour components of a colour image.

The unoccupied road area determination module 10 comprises a discrete wavelet transform (DWT) decomposition module 12 arranged to generate an LL sub-band image of an $N^{th}$ level of an (N+1)-level DWT decomposition of the captured image, by performing an iterative process of iteratively low-pass filtering and down-sampling the image N times, where N is an integer equal to or greater than one. In other words, the DWT decomposition module 12 is arranged to generate the LL sub-band image of the $N^{th}$ level of the (N+1)-level DWT decomposition of the image by low-pass filtering and down-sampling the image in a first iteration, applying the same low-pass filtering and down-sampling to a result of the first iteration to generate a result of a second iteration, applying the same low-pass filtering and down-sampling to a result of the second iteration to generate a result of a third iteration, etc.

The DWT decomposition module 12 is further arranged to generate a sub-band image of an $(N+1)^{th}$ level of the (N+1)-level DWT decomposition of the image by high-pass filtering the LL sub-band image of the $N^{th}$ level, and down-sampling a result of the high-pass filtering, such that the sub-band image of the $(N+1)^{th}$ level has at least one region of pixels having substantially equal pixel values, which represents at least one unoccupied area of the road in the image acquired by the vehicle-mounted camera, with a remaining part of the sub-band image of the $(N+1)^{th}$ level representing a remainder of the scene in the image acquired by the vehicle-mounted camera. The pixels in the at least one region of pixels may have pixels that are 'substantially equal' to each other in the sense of those pixel values having a smaller spread of pixel values (as quantified by their range, variance or standard deviation, for example) than a (identically defined) spread of pixel values among the pixels forming the remaining part of the sub-band image of the $(N+1)^{th}$ level, which represents the remainder of the scene in the image acquired by the vehicle-mounted camera.

The unoccupied road area determination module 10 further comprises a boundary data generator module 14, which is arranged to generate the boundary data by determining a boundary of the region of pixels that have substantially equal pixel values.

Figure 2:
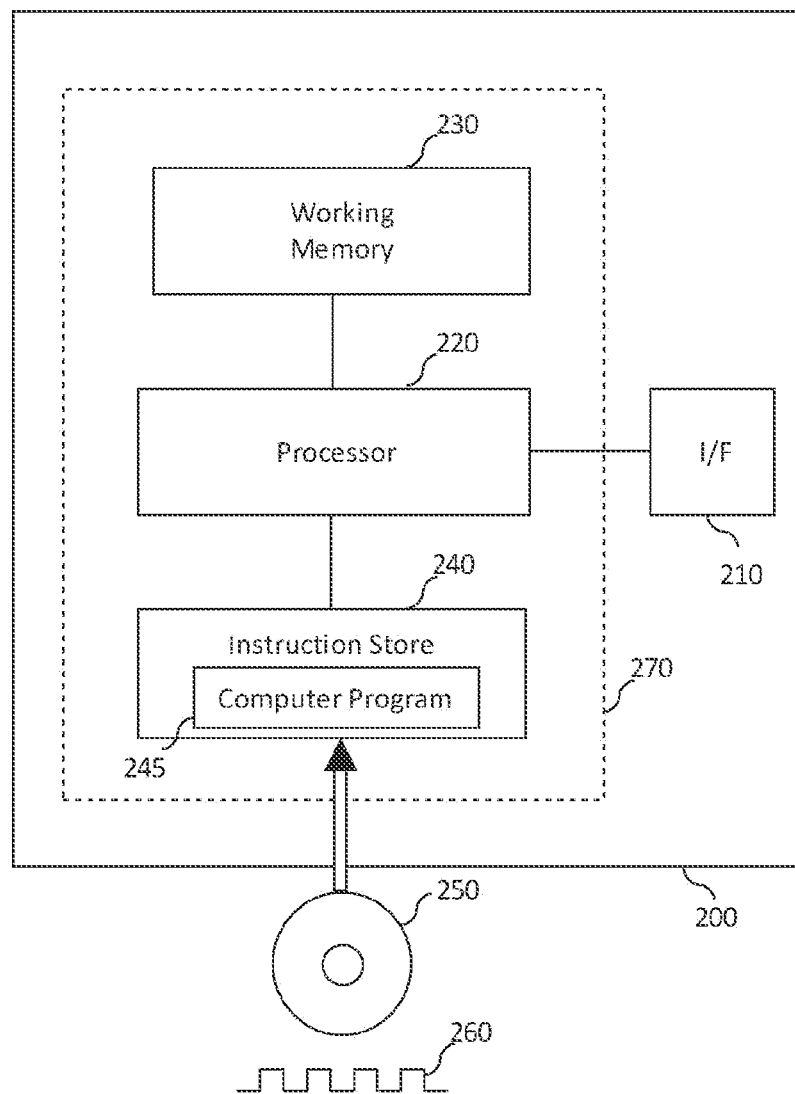
FIG. 2 is a block diagram illustrating an example implementation of the apparatus of the embodiment in programmable signal processing hardware.

FIG. 2 is a schematic illustration of programmable signal processing apparatus 200, which may be configured to implement the functionality of the apparatus 1. The signal processing apparatus 200 comprises an interface module 210 for receiving image data defining the digital image(s) captured by the vehicle-mounted camera. The signal processing apparatus 200 further comprises a processor (CPU) 220 for controlling the apparatus 1, a working memory 230 (e.g. a random-access memory) and an instruction store 240 storing a computer program comprising computer-readable instructions which, when executed by the processor 220, cause the processor 220 to perform the processing operations of the apparatus 1. The instruction store 240 may comprise a ROM (e.g. in the form of an electrically-erasable programmable read-only memory (EEPROM) or flash memory) which is pre-loaded with the computer-readable instructions. Alternatively, the instruction store 240 may comprise a RAM or similar type of memory, and the computer-readable instructions can be input thereto from a computer program product, such as a computer-readable storage medium 250 such as a CD-ROM, etc. or a computer-readable signal 260 carrying the computer-readable instructions.

In the present example embodiment, the combination 270 of the hardware components shown in FIG. 2, comprising the processor 220, the working memory 230 and the instruction store 240, is configured to implement the functionality of apparatus 1 and each of the its component modules shown in FIG. 1.

Figure 3:
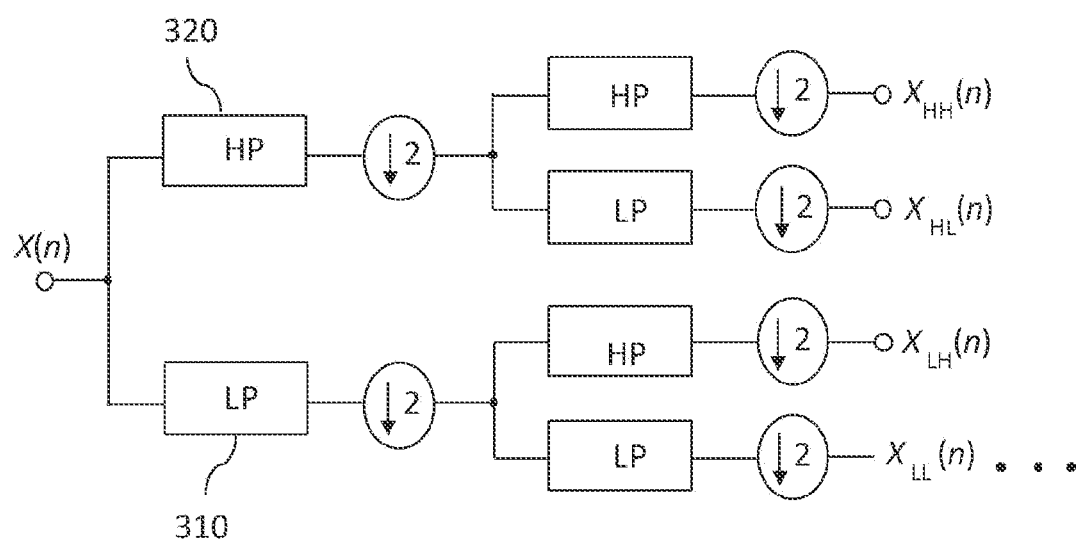
FIG. 3 is a schematic illustration of a sequence of filtering and down-sampling operations that are performed in a single-level DWT decomposition of a two-dimensional image to generate four sub-band images.

FIG. 3 illustrates a sequence of filtering and down-sampling operations that are performed for a single level of a DWT decomposition of a two-dimensional image. In FIG. 3, the input image X(n) is decomposed into four sub-band images, namely an LL sub-band image $X_{LL}(n)$, an LH sub-band image $X_{LH}(n)$, an HL sub-band image $X_{HL}(n)$, and an HH-sub-band image $X_{HH}(n)$, using the filter bank structure illustrated in FIG. 3. The subscripts LL, LH, HL and HH indicate the type of filters that are used to generate the respective sub-band images. For example, as shown in FIG. 3, the LL sub-band image $X_{LL}(n)$ is generated by applying a low-pass filter 310 across the rows of the input image X(n), down-sampling the columns of the resulting intermediate image by a factor of two, applying the low-pass filter 310 across the columns of the down-sampled image, and down-sampling the rows of the resulting image by a factor of two. The LH sub-band image is generated in a similar manner and differs from the generation of the LL sub-band only in that a high-pass filter 320 is applied across the columns of the down-sampled image instead of the low-pass filter 310.

The low-pass filter 310 and the high-pass filter 320 in the DWT decomposition form a quadrature mirror filter bank pair, such that the magnitude response of the high-pass filter 320 is derived from the magnitude response of the low-pass filter 310 by mirroring the magnitude response of the low-pass filter 310 around the value $\pi/2$ in the frequency domain. For a multi-level DWT decomposition process, the sequence of filtering and down-sampling steps, which are illustrated in FIG. 3, are performed iteratively for all levels of the DWT decomposition. That is, for a first level of a multi-level DWT decomposition process, the input image X(n) is decomposed into LL, LH, HL and HH sub-band images of the first level. For the $n^{th}$ level of the multi-level DWT decomposition process, the sequence of the filtering and down-sampling operations illustrated in FIG. 3 is performed on the LL sub-band image generated at the $(n-1)^{th}$ level of the DWT decomposition, in order to obtain the LL, LH, HL and HH sub-band images of the $n^{th}$ level.

Figure 4:
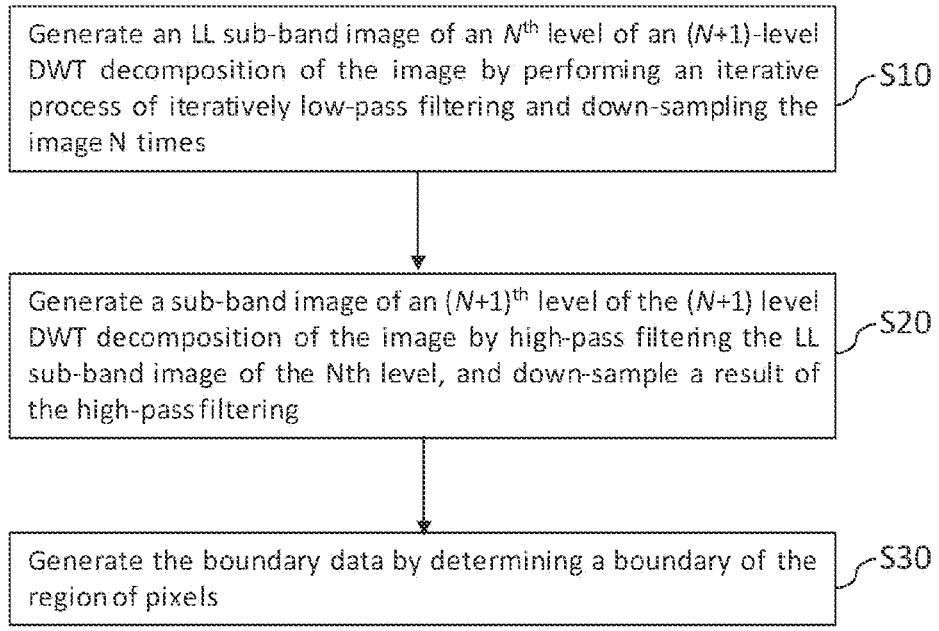
FIG. 4 is a flow diagram illustrating a method by which the unoccupied road area determination module of the apparatus of FIG. 1 processes an image to generate boundary data.

FIG. 4 is a flow diagram illustrating a method of processing an image of a scene including a road that has been acquired by the vehicle-mounted camera, which is performed by the unoccupied road area determination module 10 of FIG. 1. The image is processed to generate boundary data that is indicative of a boundary of a region of the image which represents an unoccupied area of the road.

The vehicle-mounted camera may, as in the present embodiment, be a forward-looking camera mounted on a car, van, lorry or other road vehicle, and the acquired image may contain an unoccupied area of the road ahead of the vehicle. It should be noted that the image may alternatively be a rear-view image of the road that has been acquired by a rear-view camera mounted on the vehicle, or a side-view image acquired by a side-view camera mounted on a left- or right-hand side of the vehicle.

The unoccupied road area determination module 10 may, as in the present embodiment, process the image of the scene as acquired by the vehicle-mounted camera, i.e. with no pre-processing of the image as acquired by the vehicle-mounted camera being performed before the image is input to the unoccupied road area determination module 10 for processing.

In step S10 of FIG. 4, the DWT decomposition module 12 generates an LL sub-band image of an $N^{th}$ level of an (N+1)-level DWT decomposition of the acquired image by performing an iterative process of iteratively low-pass filtering and down-sampling the image N times, where N is an integer equal to or greater than one. That is, an LL sub-band image of a first level of the (N+1)-level DWT decomposition is generated by low-pass filtering and down-sampling the image. Furthermore, for a value of N equal to or greater than two, an LL sub-band image of an $L^{th}$ level of the DWT decomposition is generated by low-pass filtering an LL sub-band image of the $(L-1)^{th}$ level, wherein L is an integer greater than 1 and less than or equal to N.

The DWT decomposition module 12 may, as in the present embodiment, use a low-pass filter 310 having a first sequence of filter coefficients that are symmetrical in at least one iteration of the iterative process of iteratively low-pass filtering and down-sampling that is performed in step S10. In addition, the filter coefficients in the sequence of filter coefficients of the low-pass filter 310 may, as in the present embodiment, have integer values. Furthermore, the filter coefficients in the sequence may, as in the present example, be set to the values in a row of Pascal's triangle having the same number of values as the order of the low-pass filter 310. However, the sequence of filter coefficients of the low-pass filter 310 need not be selected based on the rows of Pascal's triangle, and may alternatively take the form of other integer values that are symmetric.

In the present embodiment, each iteration of the iterative low-pass filter and down-sampling may be performed using the sequence of low-pass filtering and down-sampling steps illustrated in FIG. 3 for generating the LL sub-band. That is, each iteration of the iterative low-pass filtering and down-sampling process performed in step S10 may comprise applying a $1 \times L_1$ row kernel corresponding to the low-pass filter 310 across the rows of the LL sub-band image of the previous level of the DWT decomposition (herein also referred to as the 'DWT level') (or across the rows of the acquired image if the iteration corresponds to a first level of DWT decomposition), down-sampling the columns of the low-pass filtered image by a factor of two, further applying a $L_2-1$ column kernel corresponding to low-pass filter 310 across the columns of the down-sampled image, and then down-sampling the further filtered image over its rows by a factor of two.

In the present embodiment, the same low-pass filter 310 is used to filter both the rows and the columns of the input image at each of the first N levels of the (N+1)-level DWT decomposition in order to generate the LL sub-band image for each of the first N levels. However, it should be noted that the generation of the LL sub-band image of the $N^{th}$ level of the DWT decomposition is not limited in this regard. In particular, at each level of the DWT decomposition in which an LL sub-band image is computed, $L_1$ is not required to be equal to $L_2$, and different low-pass filters may be used to filter the rows and the columns. In addition, different low-pass filters having different filter coefficients and/or different filter orders may alternatively be used for different levels of the DWT decomposition.

In an alternative embodiment, each iteration of the iterative low-pass filtering and down-sampling in step S10 may instead comprise applying a $L_2 \times 1$ column kernel corresponding to the low-pass filter 310 across the columns of the LL sub-band image of the previous level of the DWT decomposition (or across the columns of the input image if the iteration corresponds to a first level of DWT decomposition), down-sampling the low-pass filtered image over its rows by a factor of two, applying a $1 \times L_1$ row kernel corresponding to the low-pass filter 310 across the rows of the down-sampled image, and down-sampling the columns of the further filtered image by a factor of two.

Furthermore, in some embodiments, each iteration of the iterative low-pass filtering and down-sampling performed in step S10 of FIG. 4 comprises generating a low-pass filtered sub-band image by applying a two-dimensional kernel across the LL sub-band image of the previous level of the DWT decomposition (or across the acquired (input) image if the iteration corresponds to first level of DWT decomposition). The two-dimensional kernel is separable into a product of two one-dimensional kernels, namely a row kernel and a column kernel. The row kernel and the column kernel are each defined by a low-pass filter 320. The low-pass filtered image may then be down-sampled by a factor of two along both its rows and columns.

In step S20 of FIG. 4, the DWT decomposition module 12 generates a sub-band image of an $(N+1)^{th}$ level of the (N+1)-level DWT decomposition of the input image by high-pass filtering the LL sub-band image of the $N^{th}$ level, and then down-sampling a result of the high-pass filtering such that the sub-band image of the $(N+1)^{th}$ level has a region of pixels having substantially equal pixel values, which represents the unoccupied area of the road in the image acquired by the vehicle-mounted camera.

Pixels neighbouring the region in the sub-band image of the $(N+1)^{th}$ level may have pixel values that are substantially different from the pixel values of the pixels inside the region. The region may, as in the present embodiment, be a substantially dark region defined by pixels having low pixel values, as the high-pass filtering of the LL sub-band image of the $N^{th}$ level removes low spatial frequency components of the image that represent the largely homogenous surface of the road. Accordingly, the region in the sub-band image of the (N+1)-level may, as in the present embodiment, have pixels with pixel values that are substantially lower than those of pixels outside the region that neighbour (i.e. that are adjacent to) the region. In addition, the region may have an average pixel value that is substantially lower than an average pixel value of pixels outside the region that neighbour the region.

The high-pass filtering used to generate the sub-band image of the $(N+1)^{th}$ level in step S20 of FIG. 4 may, as in the present embodiment, comprise applying a high-pass filter 320 having a sequence of filter coefficients that are symmetrical. In addition, the filter coefficients in the sequence may, as in the present embodiment, also be integer-valued. Furthermore, alternate filter coefficients in the sequence of filter coefficients of the high-pass filter 320 may, as in the present embodiment, be set to correspondingly located values in a row of Pascal's triangle having the same number of values as the order of the high-pass filter 320. Further, in the present embodiment, each remaining filter coefficient in the sequence of filter coefficients of the high-pass filter 320 is set to a value obtained by multiplying a correspondingly-located value in the row of Pascal's triangle by −1. It should be noted, however, that the filter coefficients of the low-pass filter 310 and the high-pass filter 320 used to generate the LH sub-band are not limited to those of the symmetrical, integer-valued filters as described above.

In the present example, N is taken to be 4, such that the LL sub-band of the $4^{th}$ level of a 5-level DWT decomposition of the image is generated by the DWT decomposition module in step S10 of FIG. 4. However, the value of N is not limited in this regard. In some embodiments, the DWT decomposition module 12 is arranged to set the value of N to a value that is based on an image resolution of the image captured by the vehicle-mounted camera, for example by using a predetermined mapping between values of the image resolution and values of N. In other embodiments, particularly in cases where the resolution of the images captured by the vehicle-mounted camera is known and not expected to change, the value of N may be predetermined and may, for example, be set to a value of four or greater. The iterative low-pass filtering and down-sampling across (N+1)-levels of DWT decomposition performed at step S10 of FIG. 4 achieves the effect of smoothing the image and extracting increasingly narrow bandwidth of low spatial frequency components with each iteration. As the number of iterations of the iterative low-pass filtering increases (corresponding to increasing levels of the DWT decomposition), the signal components corresponding to the unoccupied area of the road are extracted, as these signal components typically form the lowest frequency components in the image of the scene acquired by the camera, owing to the generally homogeneous appearance of much of the road surface.

Furthermore, in the present embodiment, the sub-band image of the $(N+1)^{th}$ level of the DWT decomposition generated in step S20 of FIG. 4 is an LH sub-band of a 5th level of the 5-level DWT decomposition (herein also referred to as the '5th level'). It should be noted, however, that the sub-band image of the $(N+1)^{th}$ level need not be the LH sub-band image, and may alternatively be the HL sub-band image or the HH sub-band image of the $(N+1)^{th}$ level of the DWT decomposition. Generating the LH sub-band image of the $5^{th}$ level may, as in the present embodiment, comprise applying the $1 \times L_1$ row kernel corresponding to the low-pass filter 310 across the rows of LL sub-band image of $4^{th}$ level, down-sampling the columns of the low-pass filtered image by a factor of two, further applying a $L_2 \times 1$ column kernel corresponding to the low-pass filter 320 across the columns of the down-sampled image, and then down-sampling the further filtered image over its rows by a factor of two to generate the LH sub-band image of the $5^{th}$ level.

In addition, the LH sub-band of the $5^{th}$ level may, as in the present embodiment, be generated using a low-pass filter 310 and a high pass-filter 320 that form a quadrature mirror pair. In the present embodiment, the low-pass filter 310 and the high-pass filter 320 used to generate the LH sub-band image of the $5^{th}$ level are filters of the same order, such that $L_1 = L_2$. However, it should be noted that the low-pass filter 310 need not be of the same order as the high-pass filter 320, and that the dimensions of the kernels corresponding to each filter may instead be selected based on the characteristic properties of the features of the image that are being sought.

In some embodiments, generating the LH sub-band image of the $5^{th}$ level may alternatively comprise applying a $L_2 \times 1$ column kernel corresponding to the high-pass filter 310 across the columns of the LL sub-band image of the $4^{th}$ level, down-sampling the low-pass filtered image over its rows by a factor of two, applying a $1 \times L_1$ row kernel corresponding to the low-pass filter 310 across the rows of the down-sampled image, and down-sampling the columns of the further filtered image by a factor of two to generate the LH sub-band image of the $5^{th}$ level of the DWT decomposition.

Furthermore, in some embodiments, generating the LH sub-band of the $5^{th}$ level may alternatively be performed by first generating a filtered sub-band image applying a two-dimensional kernel across the LL sub-band image of the $4^{th}$ level. The two-dimensional kernel is separable into a product of two one dimensional kernels, namely, a row kernel and a column kernel. The row kernel corresponds to the low-pass filter 310 and the column kernel corresponds to the high-pass filter 320. The low-pass filtered image may then be down-sampled by a factor of two along both its rows and columns by a factor of two to generate the LH sub-band image of the $5^{th}$ level.

Each of the low-pass filter 310 and the high-pass filter 320 may, as in the present embodiment, have symmetrical, integer-valued filter coefficients which are set in accordance with the values in a row of Pascal's triangle. More specifically, in the present embodiment, the low-pass filter 310 that is used to generate the LH sub-band image of the $5^{th}$ level of the DWT decomposition has filter coefficients of [1, 6, 15, 20, 15 6, 1], while the complementary high-pass filter, which forms a quadrature mirror pair with the low-pass filter, has filter coefficients that are obtained by multiplying every second coefficient of the low-pass filter by −1, such that the high-pass filter has filter coefficients [1, −6, 15, −20, 15−6, 1]. Furthermore, in the present example, each of the high pass filter 320 and the low-pass filter 310 may additionally be normalized by a factor of $\frac{1}{64}$ (or $\frac{1}{2^F}$ in the general case where an F-order filter is used). However, to reduce computational complexity, the filtering operations (i.e. the convolution of filter input with the filter kernels) may be performed using the integer-valued coefficients of the low-pass filter 310 and the high-pass filter 320, while the normalization factor associated with each filter may be applied separately, after the filtering operation.

A number of significant advantages can be achieved by using the symmetrical, integer-valued filters as described above. Firstly, filters having integer coefficients facilitate low-complexity implementation of the image processing algorithm described herein in software and/or hardware (FPGA or ASIC) systems. In particular, small integer-valued coefficients facilitate efficient implementation of the filtering process in fixed-point arithmetic, where multiplication operations may be realized with very small numbers of summing operations, while division can be implemented by shifting of the bits. Furthermore, by using a sequence of filter coefficients that are symmetrical, the high-pass filter of a complementary quadrature mirror pair can be designed from the sequence of filter coefficients of the low-pass filter by multiplying every second coefficient in the sequence by −1.

The inventors have found that the use of symmetric filters whose coefficients are set in accordance with values in a row of Pascal's triangle may allow the unoccupied road area in the acquired image to be determined more accurately. In particular, low-pass filters having such filter coefficients have a substantially flat frequency response, with cut-off frequencies that decrease towards zero as the filter order increases. As the signal components of interest in the image are low-frequency components that correspond to unoccupied area(s) of the road, symmetrical filters whose filter coefficients are set in accordance with the values in a row of Pascal's triangle may allow more effective filtering of unwanted high-frequency noise components in the image, and more effective extraction of the low-frequency components in the image that correspond to unoccupied road area(s). As such, symmetric filters designed based on the values of a row of Pascal's triangle may allow more effective detection of the unoccupied road area than orthogonal filters that are based on orthogonal wavelets, such as the Daubechies wavelet, for example.

FIG. 5 illustrates low-pass filter coefficients 510 for low-pass filters of different orders, which are based on the values in a row of Pascal's triangle. FIG. 5 also illustrates high-pass filter coefficients 520 for high-pass filters of different orders, which are also based on the values of a row of Pascal's triangle. In FIG. 5, the integer-valued high-pass and low-pass filters are normalized by a factor of $\frac{1}{2^F}$. However, the filters illustrated in FIG. 5 may be considered integer filters, as the filtering step may be performed using filters that are defined entirely by integer-valued coefficients, while the normalization factor may be applied as a separate step before or after the filtering operation, for example.

Figure 6:
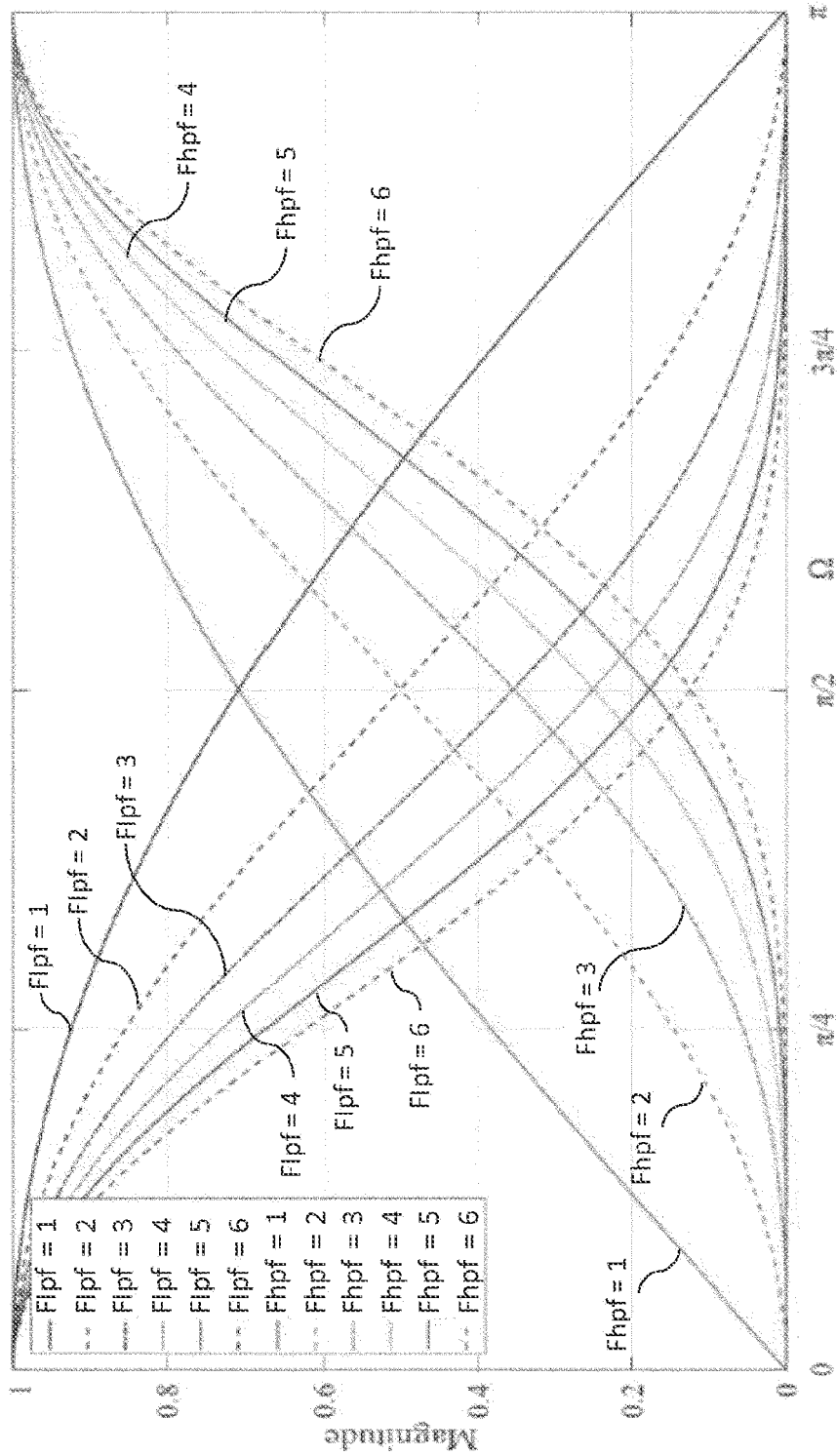
FIG. 6 illustrates frequency responses of the low-pass filters and the complementary high-pass filters of FIG. 5 for different filter orders.

FIG. 6 illustrates, for different filter orders, the frequency response of the low-pass filters and the complementary high-pass filters that are designed using a row of Pascal's triangle, as shown in FIG. 5. FIG. 6 illustrates that, as the filter order increases, the cut-off frequency of the low-pass filters decreases towards zero frequency, while the lower cut-off frequency of the high-pass filters approaches the Nyquist frequency. This provides a desired property of allowing the low-frequency components in the image to be more effectively extracted.

It should be noted that, although four sub-bands are illustrated for a single level of the DWT decomposition process in FIG. 3, the present method of determining a boundary indicative of the boundary of the unoccupied road area only requires the generation of the LL sub-band for the first N-levels of the (N+1)-level DWT decomposition, and the generation of one of an LH sub-band image, an HL sub-band image and an HH sub-band image for the $(N+1)^{th}$ level of the DWT decomposition. The remaining sub-band images of each level do not need to be generated.

Referring again to FIG. 4, in step S30, the boundary data generator module 16 generates the boundary data by determining a boundary of the region of pixels in the sub-band image of the $(N+1)^{th}$ level (which is the LH sub-band of the $5^{th}$ level in the present example) that represent the unoccupied area of the road in the acquired image. The region may, as in the present embodiment, comprise pixels with pixel values that are substantially lower than those of the neighbouring pixels of the region. For example, the region may have an average pixel value that is substantially less than the average pixel value of neighbouring pixels of the region. Furthermore, a spread of the pixel values of pixels in the region (as measured by the range, variance or standard deviation of the pixel values, for example) may be substantially less than the spread (as identically defined) of the pixel values of the pixels neighbouring the region.

Figure 7A:
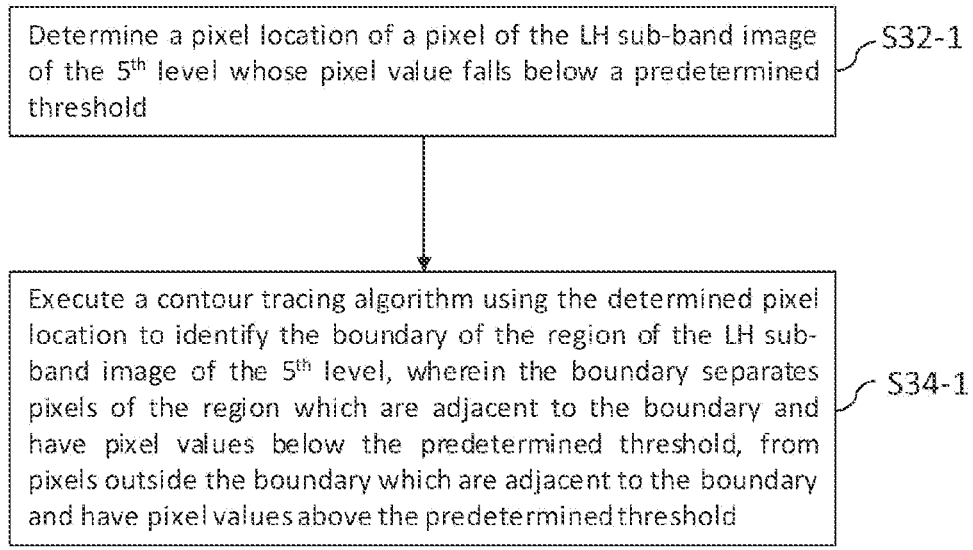
FIG. 7A illustrates a method which can be performed by a boundary data generator module of the unoccupied road area determination module to identify a boundary of a region in a sub-band image that is indicative of a boundary of an unoccupied road area in the image acquired by the vehicle-mounted camera.

FIG. 7A illustrates a method which can be performed by the boundary data generator module 14 in step S30 of FIG. 4 to identify the boundary of the region in the LH sub-band image of the $5^{th}$ level that is representative of the unoccupied road area in the acquired image.

In step S32-1 of FIG. 7A, the boundary data generator module 14 first determines a pixel location of a pixel of the LH sub-band image of the $5^{th}$ level, whose pixel value falls below a predetermined pixel threshold. The determination of this pixel location may be done iteratively, by checking each pixel of the LH sub-band image until a pixel whose pixel value is below the predetermined pixel threshold is found. The search for the pixel location may, for example, begin from the bottom boundary of the LH sub-band image, as the region of the LH sub-band image that represents the unoccupied area of the road may in practice often extend from the bottom boundary of the LH sub-band (as the camera is often mounted on the vehicle so that a lower portion of its field-of-view does not include a part of the vehicle, such as the bonnet or roof). However, the search is not limited in this regard.

In step S34-1 of FIG. 7A, once the pixel location has been determined, the boundary data generator module 14 executes a contour tracing algorithm using the determined pixel location to identify the boundary of the region. The boundary separates pixels of the region, which are adjacent to the boundary and have pixel values below the predetermined threshold, from pixels outside the boundary which are adjacent to the boundary and have pixel values above the predetermined threshold. Any suitable boundary/contour tracing algorithm may be used in step S34-1, such as the Moore-neighbour-tracing algorithm, the radial sweep algorithm, or the square tracing algorithm, for example. It should be noted, however, that the boundary need not be determined by use of a contour tracing algorithm in step S30 of FIG. 4, and may be found in any other way.

Figure 7B:
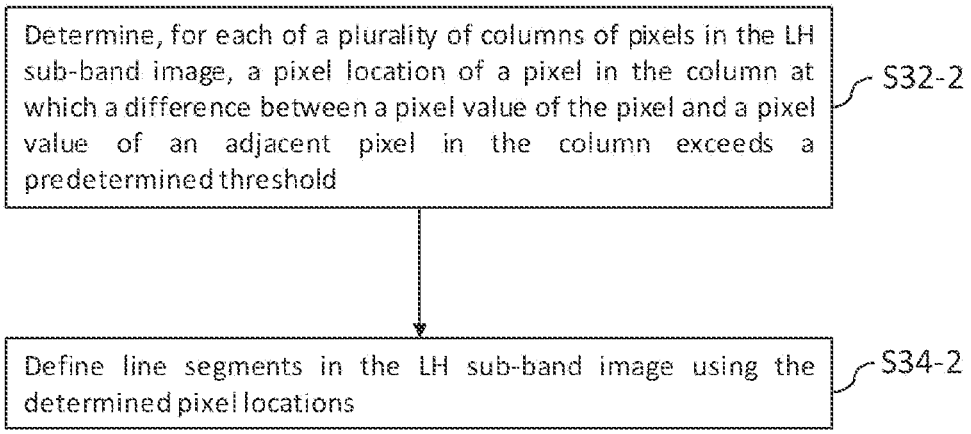
FIG. 7B illustrates an alternative method can be performed by the boundary data generator module to identify a boundary of a region in a sub-band image that is indicative of a boundary of an unoccupied road area in the image acquired by the vehicle-mounted camera.

For example, FIG. 7B illustrates an alternative method which can be performed by the boundary data generator module 14 in step S30 of FIG. 4 to determine the boundary of the aforementioned region in the LH sub-band image of the $5^{th}$ level.

In step S32-2 of FIG. 7B, the boundary data generator module 14 determines, for each of a plurality of columns of pixels in the LH sub-band image of the $5^{th}$ level, a pixel location of a pixel in the column at which a difference between a pixel value of the pixel, and a pixel value of an adjacent pixel in the column, exceeds a predetermined threshold.

In step S34-2 of FIG. 7B, the boundary data generator module 14 further defines line segments in the LH sub-band image of the $5^{th}$ level using the determined pixel locations. The line segments define the boundary of the aforementioned region in the LH sub-band image. The pixel location (at which the difference between the pixel value of the pixel and the pixel value of the adjacent pixel in the column exceeds a predetermined threshold) may, for example, be determined for each of the plurality of columns of pixels in the LH sub-band image by evaluating the difference for successive pixels in the column, starting from a pixel at a bottom of the column, for example. Furthermore, each of the line segments may be defined to connect a pixel at the determined pixel location in a respective column of the plurality of columns of pixels to a pixel at the determined pixel location in an adjacent column of the plurality of columns of pixels.

Figure 8A:
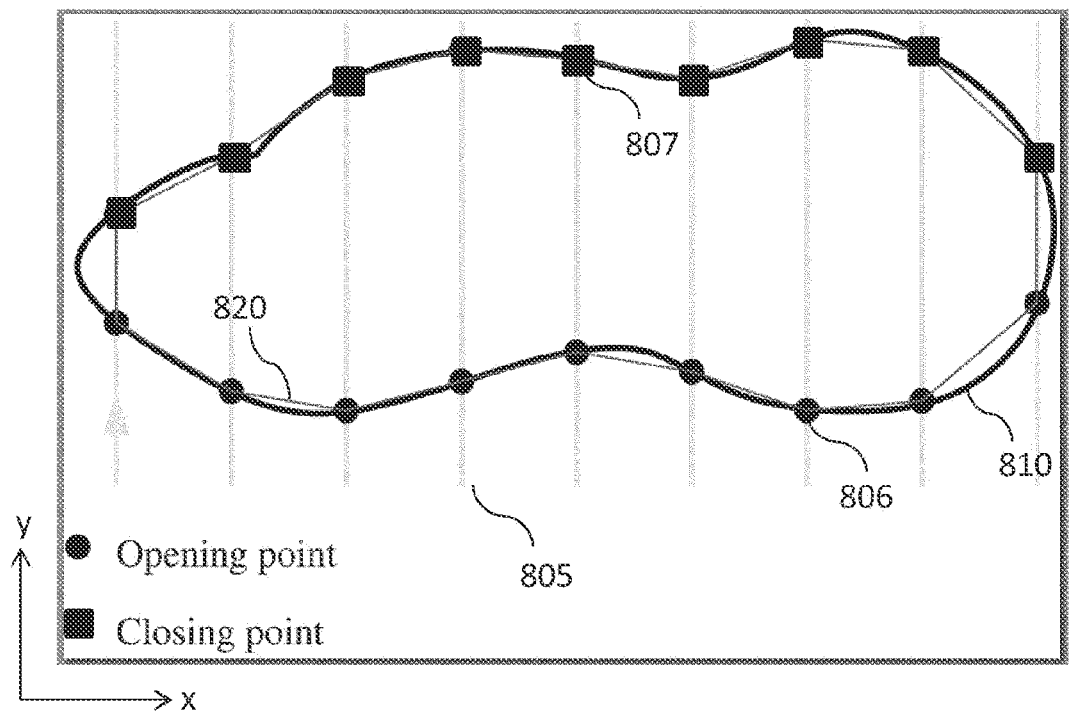
FIG. 8A illustrates the generation of a boundary of a region in a sub-band image that is indicative of a boundary of an unoccupied road area in the image acquired by the vehicle-mounted camera, in an example implementation of the method of FIG. 7B.

FIG. 8A illustrates an example implementation of the method of FIG. 7B. In FIG. 8A, a plurality of pixel columns 805 extend across an image, in which a boundary around a dark region 810 in the image is to be determined. Although not shown in FIG. 8A for clarity, it is assumed that the region of the image within the boundary 810 is significantly darker than the part of the image outside the boundary 810. In FIG. 8A, for each column 805 that is selected for analysis, the change in pixel value between each pixel in the column 805 and an adjacent pixel in the same column 805 is evaluated. For each column 805, an opening point 806 (marked by a black dot in FIG. 8A) is designated at a pixel location where a change in pixel value between adjacent pixels exceeds a negative threshold (namely, a point of transition from a 'bright' pixel to a 'dark' pixel). Upon determining an opening point 806 in each column 805, the comparison of pixel values of adjacent pixels in the column is continued from the opening point 806 along the column, and a closing point (illustrated as a black square in FIG. 8A) is designated at the next pixel location where a change in pixel value between adjacent pixels exceeds a positive threshold (namely, a point of transition from a 'dark' pixel to a 'bright' pixel). Upon determining an opening point 806 and closing point 807 for each column 805, opening points 806 in adjacent columns are connected using a polyline 820, and closing points 807 in adjacent columns are connected using a polyline 830. Furthermore, for columns of the plurality of columns 805 that are closest to the left- and right-hand boundaries of the LH sub-band image, the opening point 806 and closing point 807 may also be joined by a line segment. In this manner, as shown in FIG. 8A, a closed contour defined by polyline segments is generated. The closed contour defines the boundary of the region of the LH sub-band image of the $5^{th}$ level that represents the unoccupied road area in the original image of the scene.

Figure 8B:
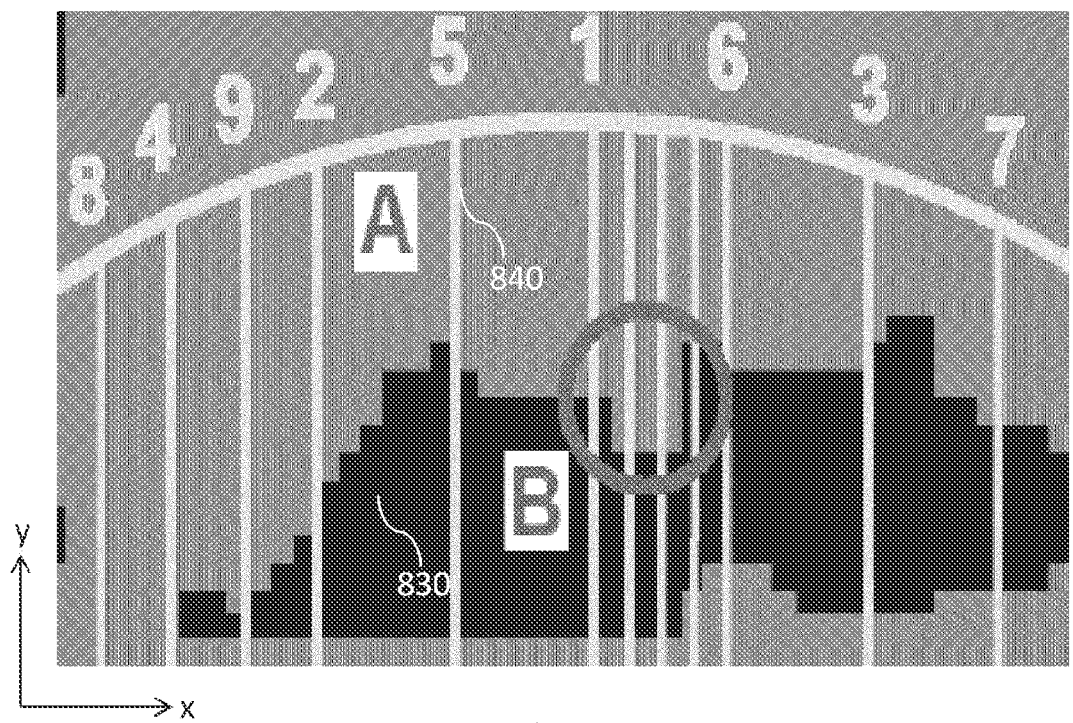
FIG. 8B illustrates the generation of a boundary of a region in a sub-band image that is indicative of a boundary of an unoccupied road area in the image acquired by the vehicle-mounted camera, in another example implementation of the method of FIG. 7B.

In some embodiments, the pixel columns 805 in step S32-2 of FIG. 7B may be selected in a sequential manner as shown in FIG. 8B. In FIG. 8B, the method of FIG. 7B is applied to an LH sub-band image in which a boundary is to be determined around a dark region 830 in the LH sub-band image that represents the unoccupied road area in the image of the scene. In FIG. 8B, a plurality of columns 840 of the LH sub-band image is sequentially selected and analysed. The order in which the columns 840 are analysed is based on the numbering which appears above each column. As shown in FIG. 8B, the first column of pixels selected for analysis may be a pixel column in a central area of the LH sub-band image, such that the pixel column splits the LH sub-band image into two halves. Then, two further pixel columns are selected at horizontal coordinates of the LH sub-band image such that each of the two halves are split into two new substantially equal regions. The process is then repeated. For example, for an image of size 255×255 pixels, pixel columns at the following x-coordinate position may be selected at each step of the analysis process:

$1^{st}$ step: 128
$2^{nd}$ step: 64, 192
$3^{rd}$ step: 32, 96, 160, 224
$4^{th}$ step: 16, 48, 80, 112, 144, 176, 208, 240

In FIG. 8B, the sequence in which pixel columns 840 are analysed is illustrated by the numbering above the illustrated pixel columns 840. It should be noted that the sequence in which the pixel columns 840 are selected is by no means limited to the present example. Furthermore, in some embodiments, when a substantial difference is found between the y-values (i.e. y-axis coordinate values) of opening points (or closing points) in adjacent columns 840 that are selected for analysis, additional columns 840 can be selected for analysis between the two adjacent columns 840 in order to allow more detailed boundaries to be determined.

In some embodiments, the image of the scene may be a 360-degree field-of-view image of the road around the vehicle. Such an image can be constructed by combining images of the road that have been acquired from front-facing, side-facing and rear-facing cameras mounted on the vehicle. In such embodiments, the boundary of the region representative of the unoccupied area of the road can be determined from a sub-band image of the 360-degree image of the road by analysing the change in pixel value between adjacent pixels for each of a plurality of selected lines of pixels that extend from a centre of the sub-band image to an edge of the sub-band image. For example, if the pixels of the sub-band image are identified by the coordinates of a polar coordinate system, then each of the selected lines of pixels may extend from a central coordinate of the image, and each line of pixels may correspond to a different polar angle.

In some embodiments, where the image that is processed by the unoccupied road area determination module 10 further comprises a portion of the sky, the unoccupied road area determination module 10 may exclude from processing a portion of the image that represents the portion of the sky, in order to simplify the search for the unoccupied area of the road. In particular, the unoccupied road area determination module 10 may perform the processing described herein with reference to FIG. 4 only for the portion of the image below a horizon, which may be defined as a horizontal line running across the image whose placement in the image will depend on the inclination of the camera and can be set by inspection of images acquired by the camera.

Furthermore, in some embodiments, the boundary data generator module 14 may be arranged to apply a binary thresholding operation to the LH sub-band image of the $5^{th}$ level of the DWT decomposition (or the HL or HH sub-band image of the $5^{th}$ level, as the case may be) before determining the boundary of the region in the LH sub-band image (or the HL or HH sub-band image of the $5^{th}$ level, as the case may be) that is representative of the unoccupied road area. Applying a binary thresholding operation to the LH sub-band image may allow the dark regions corresponding the unoccupied road area to be more reliably determined from the LH sub-band image.

In some embodiments, non-linear pre-processing may be performed to normalise the $5^{th}$ level LH sub-band image before determining the boundary of the region representing the unoccupied road area. More specifically, the boundary data generator module 14 may be arranged to apply a scaling factor to the pixel value of each pixel of the LH sub-band image and saturate scaled pixel values that are above a pixel saturation threshold, before generating the boundary data (that is indicative of the boundary of the region of the image which represents the unoccupied area of the road). For example, the scaling factor may be multiplied with the pixel value of each pixel of the $5^{th}$ level LH sub-band image and the scaled pixel value may be converted into an 8-bit grey-scale value, such that scaled pixel values that are above 255 are saturated. The process of scaling followed by saturation has the effect of normalizing the LH sub-band image and improving its contrast, thus making the subsequent boundary determination process more robust to varying lighting conditions (i.e. varying contrast, brightness, and noise). In addition, the normalization can be achieved efficiently by simple multiplication operations, which is more computationally efficient than if non-linear filters were used to perform the normalization.

Once the boundary of the region in the LH sub-band image that corresponds to the unoccupied road area has been determined by the boundary data generator module 14, the determined boundary may be up-scaled and mapped to the input image or to a sub-band image of an earlier level (i.e. a lower-valued level) of the DWT decomposition, in order to facilitate extraction of other features or objects in the input image or the sub-band image, as will be described in more detail below.

Figure 9A:
FIG. 9A illustrates an example of an image of a scene including a road, which has been captured by the vehicle-mounted camera.
Figure 9B:
FIG. 9B illustrates an example of an LL sub-band image which has been generated from the image in FIG. 9A.
Figure 9C:
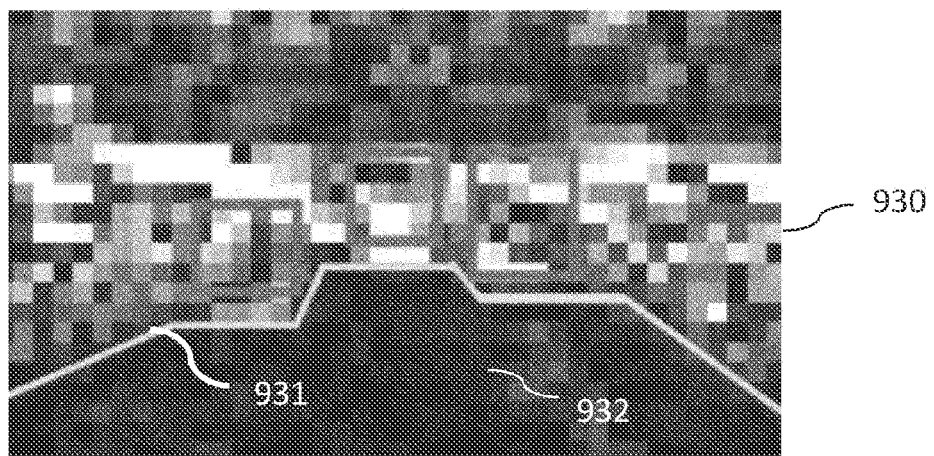
FIG. 9C illustrates an LH sub-band image which has been generated from the image in FIG. 9A.

FIG. 9A is an example image of the road, and FIGS. 9B and 9C are sub-band images generated by processing the image in accordance with step S10 and step S20 of FIG. 4. More specifically, FIG. 9A is a greyscale image 910 of a scene comprising vehicles in front of the camera and an unoccupied area of the road between the vehicle carrying the camera and the other vehicles. FIG. 9B is the LL sub-band image 920 of a $4^{th}$ level DWT decomposition of input image 910 of FIG. 9A, which has been generated by the process of step S10 in FIG. 4, and using a low-pass filter having symmetric filter coefficients [1, 6, 15, 20, 15 6, 1] that are based on the values of a row of Pascal's triangle. As can be seen from FIG. 9B, the iterative low-pass filtering and down-sampling process generates a reduced resolution sub-band image, in which a high spatial frequency component corresponding from small-sized features in the input image are substantially removed, leaving only the low-frequency components. FIG. 9C is an LH sub-band image 930 of the $5^{th}$ level of the DWT decomposition of the input image 910 shown in FIG. 9A, which is generated by process S20 in FIG. 4. The LH sub-band image 930 shown in FIG. 9C is generated using the same low-pass filter as used to generate the $4^{th}$ level LL sub-band image 920 in the image shown in FIG. 9B, and by using a high-pass filter having filter coefficients [1, −6, 15, −20, 15−6, 1]. The image shown in FIG. 9C also illustrates the boundary 931 of a dark region 932 of the LH sub-band image 930 of the $5^{th}$ level, which has been found using the boundary determination process performed in step S30 of FIG. 4. The dark region 932 represents the occupied road area in the image acquired by the vehicle-mounted camera. In addition, in the present example, the low-pass filter and the high-pass filter are each normalized by a factor of ⅟₆₄. The normalization may, as in the present example, be implemented as a separate operation from the filtering operation, as described in previous examples.

Figure 10A:
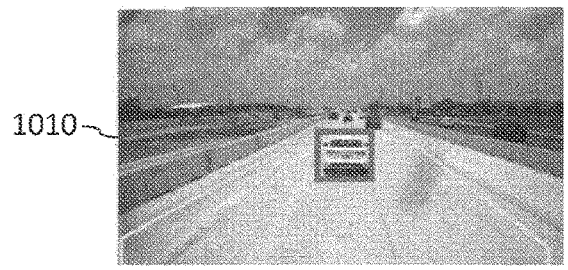
FIGS. 10A to 10C illustrate different images acquired by the vehicle-mounted camera.
Figure 10D:
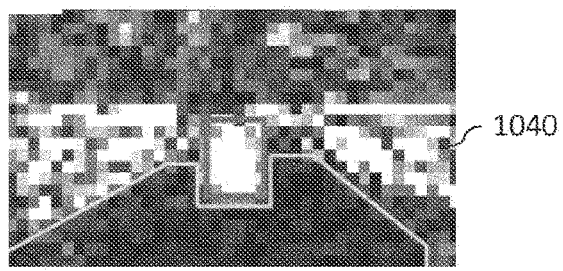
FIGS. 10D to 10F illustrate LH sub-band images derived from the images of FIGS. 10A to 10C, respectively, using the image processing method of FIG. 4.
Figure 10B:
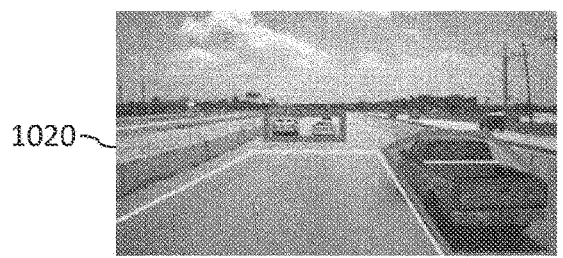
Figure 10E:
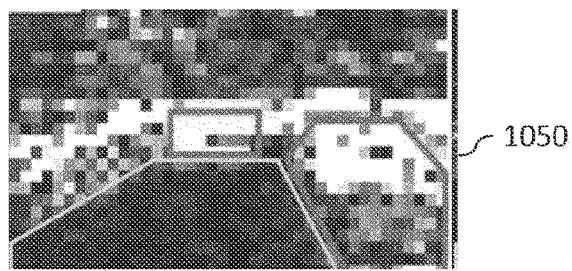
Figure 10C:
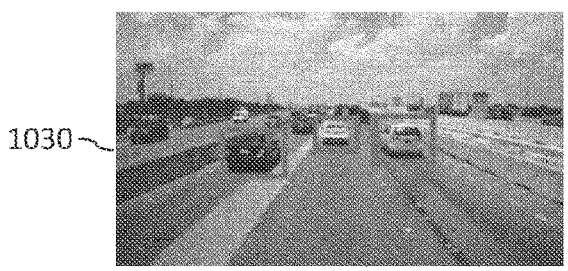
Figure 10F:
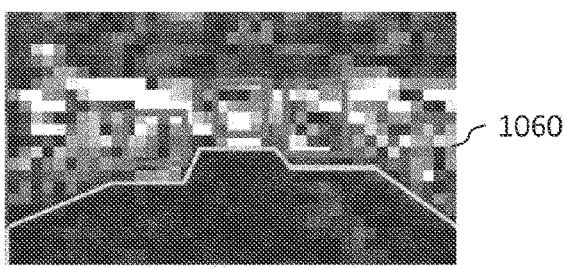

FIGS. 10A to 10C are images with different contrast, brightness, and uneven brightness of the road, and FIGS. 10D to 10F show results of applying the process described above with reference to FIG. 4 to images 10A to 10C, respectively. FIG. 10A is an image 1010 of a scene that has high contrast and low brightness, and FIG. 10D illustrates the LH sub-band image 1040 of the 5th level DWT decomposition which has been generated from the image 1010 in FIG. 10A by performing step S20 of FIG. 4 and using the same filters as described above in connection with FIG. 9. FIG. 10B is an image 1020 of a scene that has high contrast and low brightness, and FIG. 10E illustrates the LH sub-band image 1050 of the 5th level DWT decomposition which has been generated from the image 1020 of FIG. 10B by performing the process of step S20 of FIG. 4 and using the same filters as described above in connection with FIG. 9. FIG. 10C is an image 1030 of a scene wherein the road comprises road lanes having different brightness. FIG. 10F illustrates the LH sub-band image 1060 of the 5th level of the DWT decomposition which has been generated from the image 1030 shown in FIG. 10C by performing step S20 of FIG. 4 and using the same filters as described above in connection with FIG. 9. Despite the varying levels of brightness across the road, the region in the LH sub-band image 1060 in FIG. 10F that represents the unoccupied road area in FIG. 10C appears as an evenly dark region due to the high-pass filtering performed at the 5th level of the DWT decomposition.

Although the dark region corresponding to the unoccupied area of the road is determined from the LH sub-band in the examples of FIGS. 9A to 9CA to 10F, the region can alternatively be determined from the HL or HH sub-band with similar effect. However, as illustrated in FIGS. 9A to 9C and 10A to 10F, the LH sub-band is suitable for determining the unoccupied road area when the image being processed is of the road in front of the vehicle and has been captured by a forward-facing camera mounted at a relatively low elevation. In this scenario, the left- and right-hand boundaries of the road (for example, the boundaries that separate the road from the neighbouring pavement or road barriers) are largely horizontal in the acquired image. These substantially horizontal boundaries are emphasised as white areas in the LH sub-band of the 5th level of the DWT decomposition due to the application a high-pass filter along the columns of the LL sub-band image of 4th level of the DWT decomposition. As a result, a dark region representing an unoccupied road area may be easily detectable in the LH sub-band image. As the characteristics of the image to be processed may vary (with, for example, a curvature of the road, the position of the vehicle relative to a road boundary, or the elevation of the vehicle-mounted camera), the orientation of the road boundaries that encompass the unoccupied road area may also vary. Under some circumstances, it may therefore be more appropriate to use the HL sub-band (which emphasises the vertical features in the image) or the HH sub-band (which emphasises the diagonal features in the image) for finding the dark region that corresponds to the unoccupied road area.

More generally, applying a high-pass filter to an LL sub-band image of a given level of the DWT decomposition of the image, which has been obtained by iteratively low-pass filtering and down-sampling the image as described above, can allow the unoccupied area of the road to be identified effectively. This is because the low-pass filtering operations tend to smooth out this region of the image to have pixels with a narrower range of pixel values than the remainder of the image, allowing the region to be easily distinguished from the remainder of the image by the action of the high-pass, which results in the region having more uniform and lower pixel values that the remainder of the image. In addition, the down-sampling performed in the iterative process that is used to generate the LL sub-band image significantly reduces the amount of data to be processed when determining the boundary of the region, allowing the unoccupied area of the road to be identified efficiently.

It is noted that, although the examples in FIGS. 9A to 9C and 10A to 10F are based on images captured by a forward-facing camera mounted on the vehicle, the image processing method described above may alternatively be applied to images of the road that have been captured by a side-facing or a rear-facing camera mounted on the car. Rear-view and side-view images are often taken to build a road occupancy map of the vehicle, which can be particularly useful for informing the driver of the presence of an object in a blind spot of the vehicle, for example. However, rear-view and side-view cameras used on vehicles are often wide-angle cameras that introduce a high level of distortion into the captured image. It is therefore often necessary to correct the acquired images for the distortion before the resulting distortion-corrected images can be seamlessly merged to produce the road occupancy map for the vehicle.

However, distortion correction and seamless merging operations have high complexity due to the requirement to perform affine transformation of all pixels in the image. Conventional approaches to generating road occupancy maps of this kind are therefore generally processor resource-intensive.

The unoccupied road area determination module 10 overcomes the above-identified short-coming of conventional approaches to generating road occupancy maps and allows a road occupancy map to be generated in a computationally inexpensive way. More particularly, when an image having high level of distortion is to be processed to generate a road occupancy map, the unoccupied road area determination module 10 may first process the image in accordance with the method of embodiment described above with reference to FIG. 4 (or one of the described variants) to generate boundary data indicative of a boundary of a region of the (distorted) image which represents an unoccupied area of the road. Affine transformation for correcting distortion can then be applied only to the (originally generated or a scaled version of the originally generated) boundary data, rather than to each pixel of the sub-band or input image, thereby allowing the unoccupied road area in the image to be accurately determined with significantly reduced computational complexity. The distortion-corrected boundary data can then be used to build a road occupancy map for the vehicle. For example, the unoccupied road area determination module 10 may combine boundary data obtained for each image of a plurality of images to generate the road occupancy map.

Referring again to FIG. 1, the unoccupied road area determination module 10 may, as in the present embodiment, comprise a refined boundary data generator module 16, which is arranged to generate refined boundary data indicative of the boundary of the region of the input image which represents the unoccupied area of the road. In particular, the boundary of the region representative of the unoccupied road area that is determined in step S30 in FIG. 4 may, in some cases, provide an overly conservative estimate of the boundary of the unoccupied road area, such that the determined boundary lies within an actual boundary of the unoccupied road area in the input image (as determined by inspecting the input image by eye). It may therefore be desirable to refine the boundary data determined from the (N+1)[th] level sub-band image in step S30 of FIG. 4 by using one or more sub-band images obtained at a lower-valued level of the DWT decomposition (i.e. a level of the DWT decomposition that provides a higher resolution sub-band image, which contains more detailed/higher spatial frequency components).

Figure 11:
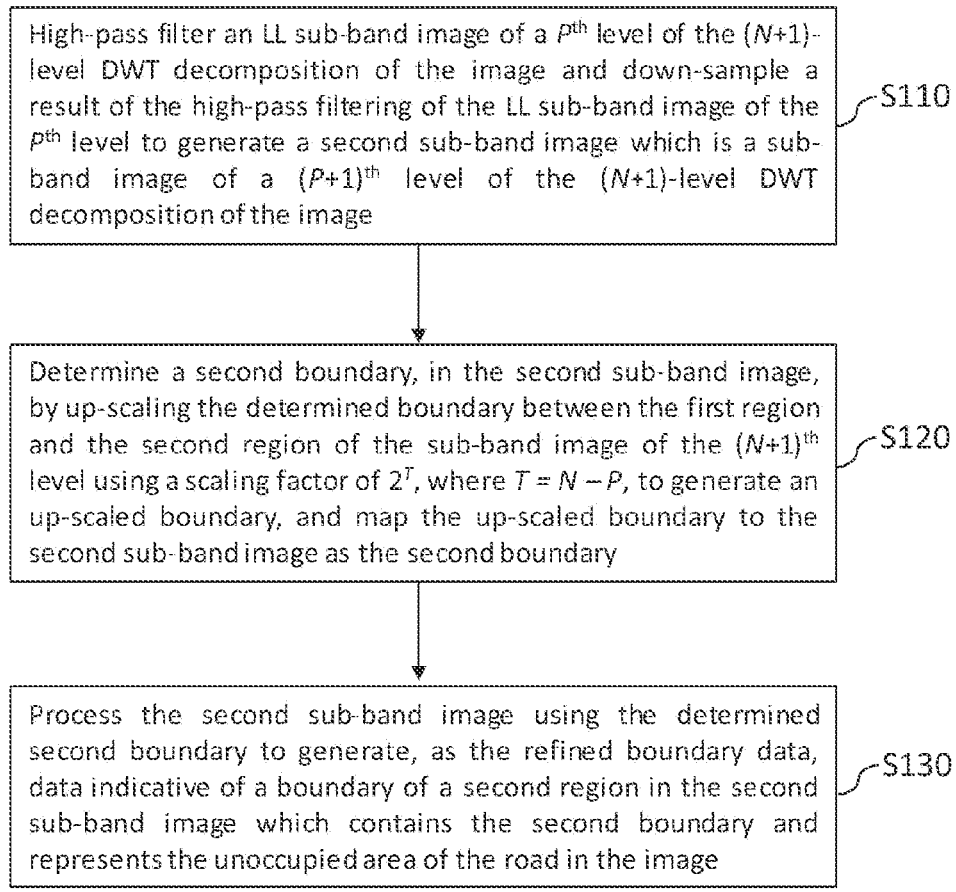
FIG. 11 illustrates a method performed by a refined boundary data generator module of the embodiment.

FIG. 11 illustrates a method performed by the refined boundary data generator module 16. In step S110 of FIG. 11, the refined boundary data generator module 16 generates refined boundary by high-pass filtering an LL sub-band image of a $P^{th}$ level of the (N+1)-level DWT decomposition of the image (where P is an integer smaller than N) and down-sampling a result of the high-pass filtering of the LL sub-band image of the $P^{th}$ level to generate a second sub-band image, which is a sub-band image of a $(P+1)^{th}$ level of the (N+1)-level DWT decomposition of the image. The LL sub-band image of the $P^{th}$ level may be generated using the same type of filters and using the same sequence of filtering as previously described for generating the LL sub-band of $N^{th}$ level in step S10 of FIG. 4. Similarly, the sub-band image of the $(P+1)^{th}$ level may be generated using the same type of filters and using the same sequence of filtering as previously described for generating the sub-band of the $(N+1)^{th}$ level in step S20 of FIG. 4.

In step S120 of FIG. 11, the refined boundary data generator module 16 up-scales the determined boundary of the region of the sub-band image of the $(N+1)^{th}$ level using a scaling factor of $2^T$, where T=N−P, to generate an up-scaled boundary, and maps the up-scaled boundary to the second sub-band image so to generate a second boundary, which is in the second sub-band image.

In step S130 of FIG. 11, the refined boundary data generator module 16 processes the second sub-band image using the determined second boundary to generate, as the refined boundary data, data indicative of a refined boundary of a second region in the second sub-band image, which contains (encompasses) the second boundary and represents the unoccupied area of the road in the image. The data indicative of the boundary of the second region may, as in the present embodiment, be generated by expanding (or modifying) the determined second boundary to further bound at least one region in the second sub-band image which is defined by adjacent pixels having substantially equal pixel values. The pixels in the at least one region of pixels may have pixels that are 'substantially equal' to each other in the sense of those pixel values having a smaller spread of pixel values (as quantified by their range, variance or standard deviation, for example) than a (identically defined) spread of pixel values among the pixels forming the remaining part of the second sub-band image.

In the present example, the values of N and P are selected to be 4 and 2, respectively, and the filtered sub-band image of the $(P+1)^{th}$ level that is generated in Step S110 of FIG. 11 is the LH sub-band image of the $3^{rd}$ level of the DWT decomposition (also referred to herein as the '$3^{rd}$ level LH sub-band image' or 'LH sub-band image of the $3^{rd}$ DWT level'). However, the value of P may be selected to be any integer value less than the value of N. Furthermore, the second sub-band image in step S110 of FIG. 11 is not limited to being the LH sub-band image, and may instead be any high-pass filtered sub-band image (including the HL sub-band image or the HH sub-band image), that is computed at a level of the DWT decomposition lower in value than the level of the DWT decomposition from which the initial boundary corresponding to the unoccupied road area has been determined (in step S30 of FIG. 4).

In step S120 of FIG. 11, the refined boundary data generator module 16 upscales the boundary of the region (representing the unoccupied road area) in the LH sub-band image of the $5^{th}$ level of the DWT decomposition by a factor of 4 to generate the upscaled boundary that is then mapped to the LH sub-band image of the $3^{rd}$ level of the DWT decomposition as the second boundary in step S120 of FIG. 11. The boundary of the region in the LH sub-band of the $5^{th}$ level of the DWT decomposition may, as in the present embodiment, be upscaled by multiplying both the x-axis coordinates and the y-axis coordinates of the pixels defining the boundary by a factor of 4. It should be noted that the scaling factor of 4 is used in the present example as it represents the difference in scale between the resolution of the LH sub-band of the $3^{rd}$ level of the DWT decomposition and the resolution LH sub-band of the $5^{th}$ level of the DWT decomposition, due to the down-sampling that is performed at each level of two-dimensional multi-level DWT decomposition.

In step S130 of FIG. 11, the refined boundary data generator module 16 may, as in the present example, use the upscaled boundary in the $3^{rd}$ level LH sub-band image and the $3^{rd}$ level LH sub-band image itself to expand the upscaled boundary to further bound a region in the $3^{rd}$ level LH sub-band image that crosses or touches the upscaled boundary and is defined by pixels having pixel values below a predetermined threshold. In other words, as part of step S130, the upscaled boundary in the LH sub-band image of the $3^{rd}$ level of the DWT decomposition is expanded to include other dark regions neighbouring the upscaled boundary, in order to form the refined boundary of step S130 that encompasses the upscaled boundary. In this manner, the upscaled boundary, which is obtained by scaling the boundary found using the LH sub-band image of the $5^{th}$ level of the DWT decomposition, is refined or expanded using more detailed information that is available in the LH sub-band image of the $3^{rd}$ level of the DWT decomposition. The refined boundary determined in the LH sub-band image of the $3^{rd}$ level therefore more accurately reflects the boundary of the region in the original (input) image of the road that represents the unoccupied road area.

Figure 12:
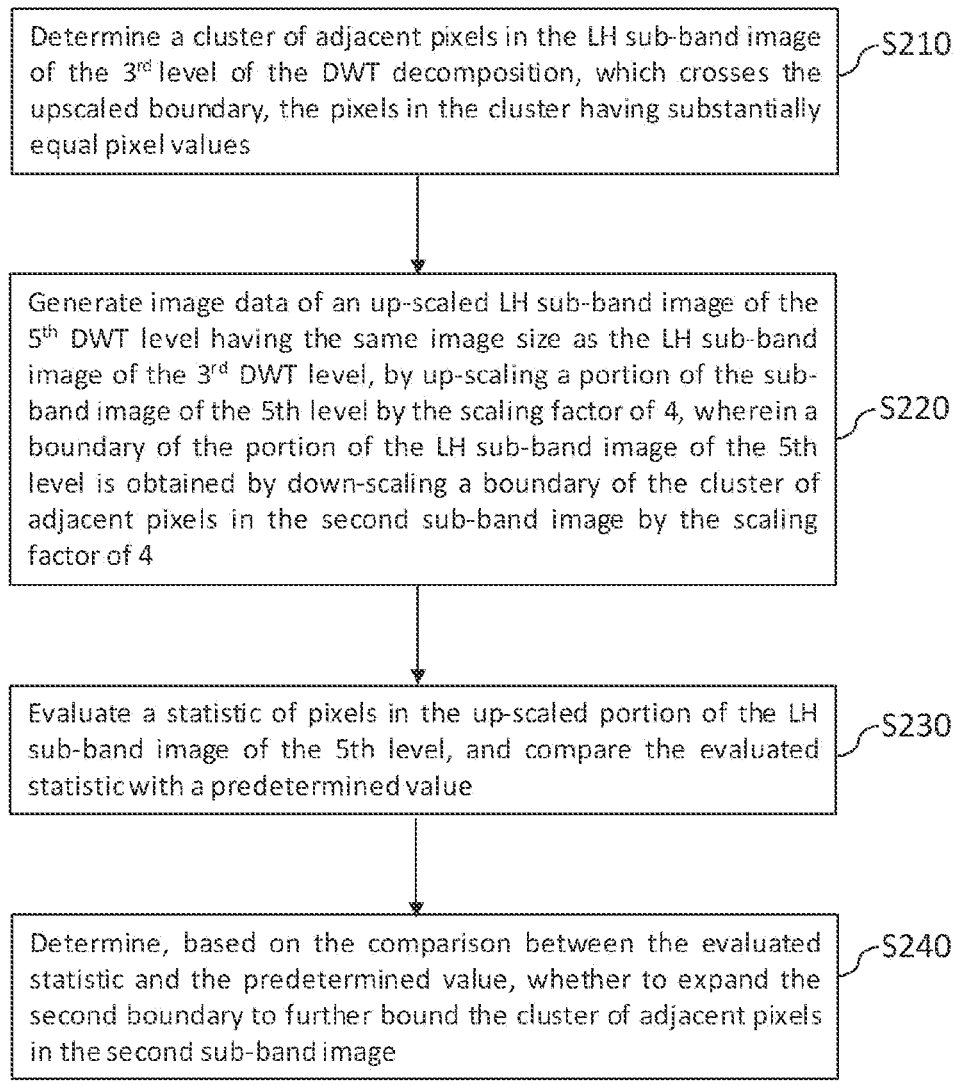
FIG. 12 illustrates a method of refining the boundary determined by the boundary data generator module, which is performed by the refined boundary data generator module of the embodiment.

FIG. 12 is a flow diagram illustrating a sequence of steps that may be performed, as part of step S130 of FIG. 11, to generate the refined (or expanded) boundary in the $3^{rd}$ level LH sub-band image of the previously described example.

In step S210 of FIG. 12, the refined boundary data generator module 16 determines a cluster of adjacent pixels in the $3^{rd}$ level LH sub-band image which touches or crosses the upscaled boundary, wherein the pixels in the cluster have substantially equal pixel values. In the present example, where no addition processing is performed beyond the steps of the DWT decomposition as described above, the regions of the $3^{rd}$ level LH sub-band image representing the unoccupied road area will be substantially dark (having low pixel values). As such, the cluster of pixels will have substantially lower pixel values than pixels neighbouring the cluster.

In step S220 of FIG. 12, the refined boundary data generator module 16 generates image data of an up-scaled LH sub-band image of the $5^{th}$ level having the same image size as the $3^{rd}$ level LH sub-band image, by up-scaling a portion of the LH sub-band image of the $5^{th}$ level by the same scaling factor as used at step S120, which is 4 in the present example. In this manner, each pixel of the cluster in the $3^{rd}$ level LH sub-band image has a corresponding pixel in the upscaled portion of the $5^{th}$ level LH sub-band image. The up-scaling may be performed using any suitable image scaling algorithm, such as, for example, nearest neighbour interpolation, or bilinear interpolation.

Furthermore, the portion of the sub-band image of the $(N+1)^{th}$ that is up-scaled is determined based on the locations of the pixels of the cluster in the second sub-band image, and a mapping between a location of each pixel of the second sub-band image with a location of a pixel of sub-band image of the $(N+1)^{th}$ level. More specifically, in the present example, for each pixel of the cluster in the $3^{rd}$ level LH sub-band image, a corresponding pixel of the LH sub-band image of the $5^{th}$ level is determined using the mapping, and up-scaled to generate the image data of the up-scaled LH sub-band image of the $5^{th}$ level. Due to the difference in resolution between the LH sub-band image of the $3^{rd}$ level and the LH sub-band image of the $5^{th}$ level, the mapping between the location of each pixel in the LH sub-band image of the $3^{rd}$ level and the location of the corresponding pixel in the LH sub-band image of the $5^{th}$ level may, as in the present example, be a many-to-one mapping. As such, when multiple pixels of the cluster in the LH sub-band image of the $3^{rd}$ level map to the same pixel in the LH sub-band image of the $5^{th}$ level, that pixel in the LH sub-band image of the $5^{th}$ level only needs to be up-scaled once.

In step S230 of FIG. 12, the refined boundary data generator module 16 evaluates a statistic of pixels in the up-scaled portion of the LH sub-band image of the $5^{th}$ level, and compares the evaluated statistic with a predetermined value.

Then, in step S240 of FIG. 12, the refined boundary data generator module 16 determines, based on the comparison between the evaluated statistic and the predetermined value, whether to expand the upscaled boundary mapped to the $3^{rd}$ level LH sub-band image to further bound the cluster of adjacent pixels in the $3^{rd}$ level LH sub-band image.

The evaluation of the statistic of the pixels in the up-scaled portion of the $5^{th}$ level LH sub-band image that is performed at step S230 of FIG. 12 may, as in the present embodiment, comprise evaluating the proportion of pixels in the up-scaled portion of the $5^{th}$ level LH sub-band image whose pixel values are below a predetermined pixel value. Furthermore, as part of step S240, the refined boundary data generator module may, as in the present embodiment, compare the evaluated proportion with a predetermined threshold. Upon determining that the evaluated proportion exceeds the predetermined threshold, the refined data generator module may, as in the present embodiment, expand the upscaled boundary in the $3^{rd}$ level LH sub-band image to include the dark cluster of pixels. However, if the evaluated proportion is below the predetermined threshold, the upscaled boundary in the $3^{rd}$ level LH sub-band is not expanded to include the adjacent cluster.

It should be noted that the statistic evaluated in step S230 of FIG. 12 is not limited to the proportion of pixels having pixel values below a predetermined pixel value, and another statistical measures may alternatively be used to determine whether the upscaled boundary should be expanded to include the cluster. For example, the evaluation in step S230 of FIG. 12 may alternatively or additionally comprise evaluating a mean of pixel values in the up-scaled portion of the $5^{th}$ level LH sub-band image, and step S240 may further comprise expanding the upscaled boundary in the $3^{rd}$ level LH sub-band image to include the dark cluster of pixels only if the evaluated mean value is below a predetermined threshold for the mean value. Furthermore, in some embodiments, the evaluation in step S240 may alternatively or additionally comprise evaluating a variance of pixel values in the up-scaled portion of the $5^{th}$ level LH sub-band image, and step S240 may further comprise expanding the upscaled boundary in the $3^{rd}$ level LH sub-band image to include the dark cluster of pixels only if the evaluated variance is below a predetermined threshold for the variance.

In the present embodiment, upon determining the refined boundary using the LH sub-band of the $3^{rd}$ level, the method of FIG. 12 may be repeated by upscaling the refined boundary to the sub-band image of a $2^{nd}$ level of the DWT decomposition, and using the upscaled boundary in the sub-band image of the $2^{nd}$ level, in conjunction with the sub-band image of the $2^{nd}$ level, to further refine or expand the upscaled boundary in the sub-band image of the $2^{nd}$ level in the same manner as described for the upscaled boundary in the LH sub-band of the $3^{rd}$ level. That is, the refinement of the upscaled boundary in the sub-band image of the $2^{nd}$ level can be performed by determining a dark cluster that touches the upscaled boundary in the sub-band image of the $2^{nd}$ level, evaluating a statistics of the corresponding pixels in an upscaled portion of the LH sub-band image of the $3^{rd}$ level, and determining whether to expand the upscaled boundary in the sub-band image of the $2^{nd}$ level to include the dark cluster based the evaluation. In this manner, the boundary refinement process can be iteratively repeated by using sub-band images of low-valued DWT levels.

In some embodiments, where the vehicle-mounted camera is arranged to acquire, as the image, an image of a scene including the road and a horizon, the determination of whether to expand the second boundary to further bound the cluster of adjacent pixels in the second sub-band image may further be based on a vertical distance (i.e. along the y-axis direction in the image) of the cluster from the horizon in the image. In particular, dark clusters in proximity to the horizon are more likely to contain false data and may therefore not be used to expand the boundary.

In some embodiments, where the image acquired by the vehicle-mounted camera is of a section of a road containing one or more road markers, the initial boundary determined from the sub-band of the $(N+1)^{th}$ level of the DWT decomposition (the $5^{th}$ level LH sub-band in the present example) at step S30 of FIG. 4, or the refined boundary that is determined from the sub-band of the $(P+1)^{th}$ level of DWT decomposition (the $3^{rd}$ level LH sub-band in the present example) at step S130 of FIG. 11 (or a further refined boundary obtained by processing the $2^{nd}$ level, as described above) can be used to define a search area within a sub-band image of the DWT decomposition, within which a search for boundary data indicative of a boundary around a region of the input image containing a road marker can be performed. In particular, using a sub-band image of the DWT decomposition to search for boundary data indicative of the boundary of the road marker region in the image of the road may allow the computational complexity of the search to be reduced, as the sub-band images are of a lower resolution compared to the original (input) image. Furthermore, by determining a boundary of a region representative of the unoccupied road in the sub-band of the $(N+1)^{th}$ level, and using the determined boundary (or a refined boundary that is obtained in accordance with the steps of FIG. 11) to define a search area in a sub-band image, within which the search for the road marker region is to be performed, the search can be made more efficient. This is because the search for the road marker region is limited to an area of the image representing the unoccupied road area, so that the available processing resources can focus on performing a search on only a part of the image where the road marker region can be located.

Accordingly, the apparatus in FIG. 1 may, as in the present embodiment, comprise a road marker determination module 20, which is arranged to process the input image to determine boundary data indicative of a boundary of a road marker region in the image of the road.

Figure 13:
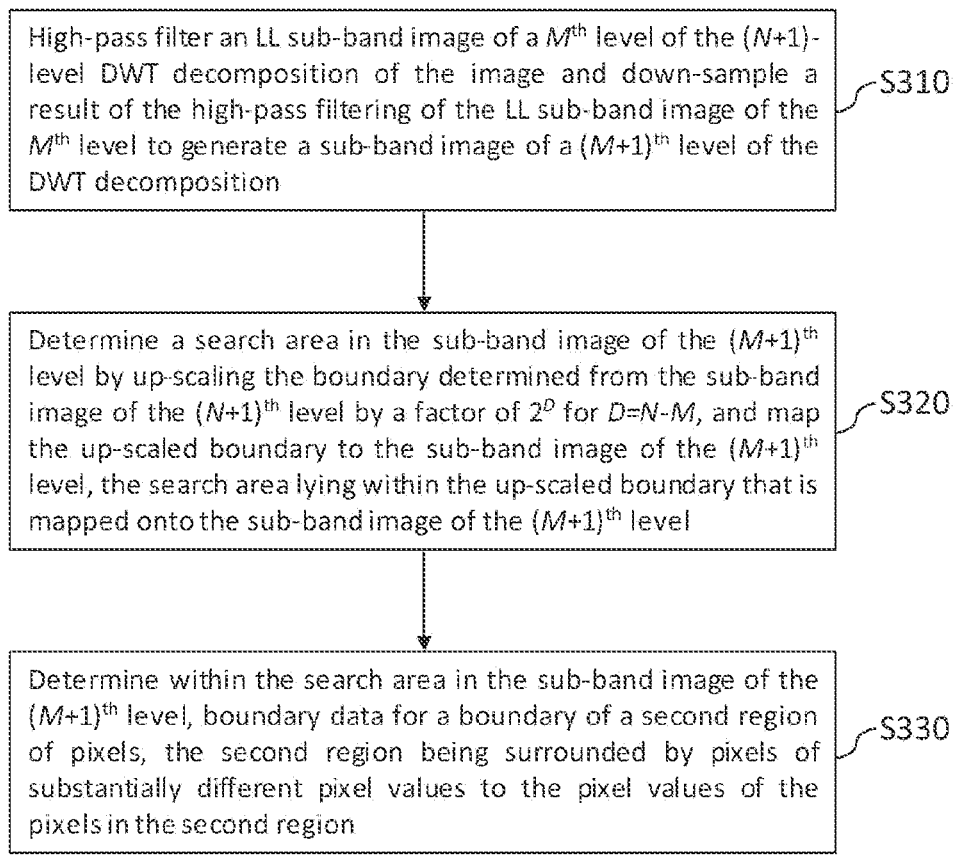
FIG. 13 illustrates a method performed by the road marker determination module of the embodiment to determine a boundary in a sub-band image that is indicative of a boundary of a road marker region in the image acquired by the vehicle-mounted camera.

FIG. 13 is a flow diagram illustrating a method performed by the road marker determination module 20 of FIG. 1. In step S310, the road marker determination module 20 high-pass filters an LL sub-band image of a $M^{th}$ level of the (N+1)-level DWT decomposition of the image and down-samples a result of the high-pass filtering of the LL sub-band image of the $M^{th}$ level to generate a sub-band image of a $(M+1)^{th}$ level of the DWT decomposition, wherein M is an integer less than value of N.

In step S320 of FIG. 13, the road marker determination module 20 determines a search area in the sub-band image of the $(M+1)^{th}$ level, by up-scaling the boundary determined from the sub-band image of the $(N+1)^{th}$ level by a factor of $2^D$, where D=N−M, and maps the up-scaled boundary to the sub-band image of the $(M+1)^{th}$ level. The search area lies within the up-scaled boundary that is mapped onto the sub-band image of the $(M+1)^{th}$ level.

In step S330 of FIG. 13, the road marker determination module 20 determines, within the search area in the sub-band image of the $(M+1)^{th}$ level, boundary data for a boundary of a region of pixels, the region surrounded by pixels of substantially different pixel values to the pixel values of the pixels in the region, and wherein the boundary of the region is indicative of the boundary of the road marker region in the image of the road. More specifically, the region in the sub-band image of the (M+1)-level may, as in the present embodiment, have pixels with pixel values that are substantially higher than those of the neighbouring pixels that are adjacent to the region. In addition, the region may have an average pixel value that is substantially higher than the average pixel value of neighbouring pixels of the region.

In step S310 of FIG. 13, the LL sub-band image of the $M^{th}$ level may be generated using the same type filters and using the same sequence of filtering as previously described in relation to step S10 of FIG. 4 for generating the LL sub-band of the $N^{th}$ level. More particularly, the LL sub-band of the $M^{th}$ level may be generated using one or more low-pass filters having a symmetrical sequence of filter coefficients, and the coefficients may further comprise integer valued coefficients. Furthermore, the coefficients of the low-pass filters may be set to the values in a row of Pascal's triangle in the same manner as previously described.

Furthermore, for step S310, the sub-band of the $(M+1)^{th}$ level may be generated using the same type filters and using the same sequence of filtering as previously described in relation to step S20 of FIG. 4 for generating the sub-band of the $(N+1)^{th}$ level. In particular, the sub-band of the $(M+1)^{th}$ level may be generated using one or more filters having a symmetrical sequence of filter coefficients, and the coefficients may further comprise integer valued coefficients. Moreover, the filters may be designed using the values of a row of Pascal's triangle in the same manner as described in previous embodiments.

Accordingly, all previous examples and embodiments described in relation to the generation of the LL sub-band of the $N^{th}$ level in step S10 of FIG. 4 also apply to the generation of the LL sub-band of the $M^{th}$ level that is processed in step S310 of FIG. 13. Similarly, all previous examples and embodiments described in relation to the generation of the (high-pass filtered) sub-band of the $(N+1)^{th}$ level in step S20 of FIG. 4 also apply to the generation of the sub-band of the $(M+1)^{th}$ level in step S310 of FIG. 13.

Figure 14A:
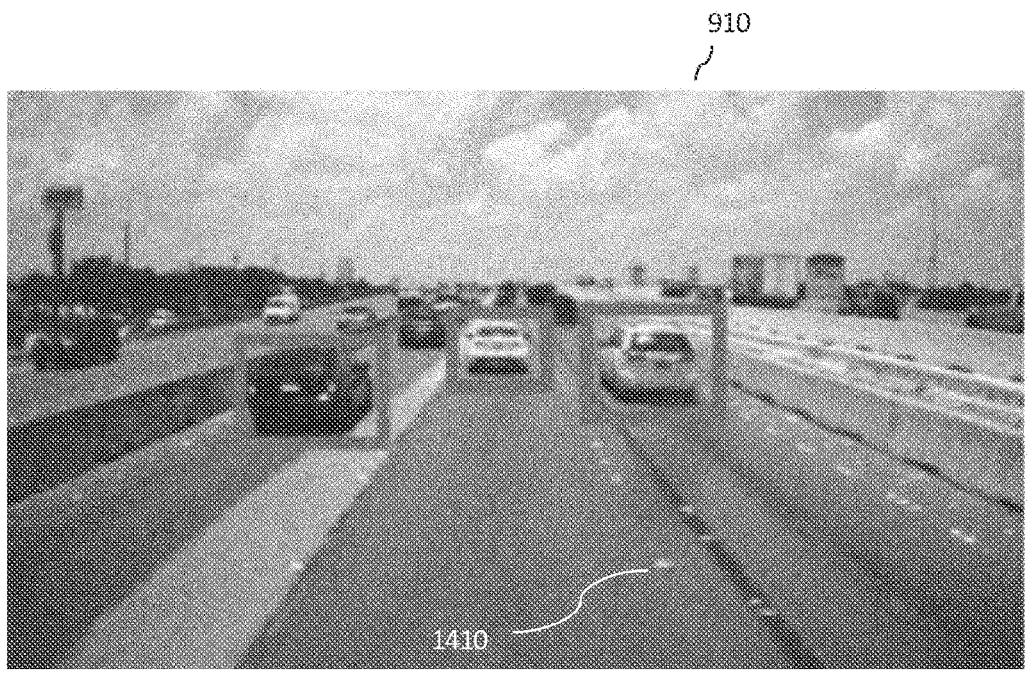
FIG. 14A illustrates an image of a road having road markers, that is processed by the road marker determination module of the embodiment.

FIG. 14A illustrates an image of a section of a road having road markers 1410 in the example form of Bott's dots. However, the road markers 1410 may be of a different kind, for example cat's eyes road studs. In the present example, the image in FIG. 14A is processed by the road marker determination module of FIG. 1 in accordance with the steps described above with reference to FIG. 13.

Figure 14B:
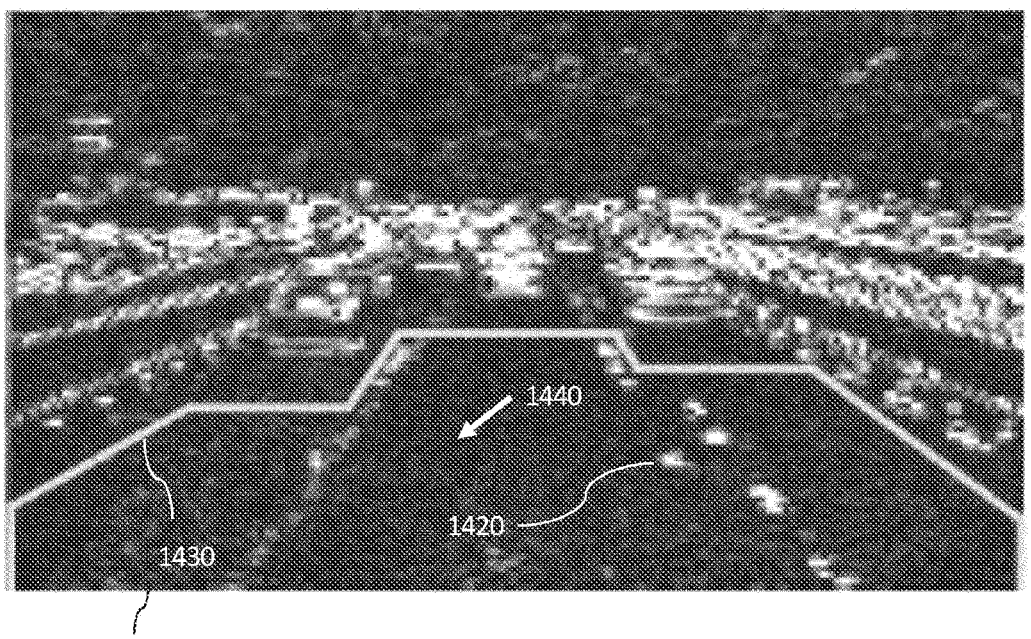
FIG. 14B illustrates a sub-band image that is generated from the image of FIG. 14A, the sub-band image showing road marker regions as bright spots on a dark region that corresponds to the unoccupied road area.

FIG. 14B illustrates an LH sub-band image of a $3^{rd}$ level DWT decomposition of the image in FIG. 14A, which has been generated by performing step S310 of FIG. 13. The LH sub-band image of the $3^{rd}$ level was generated using a low-pass filter having filter coefficients [1, 6, 15, 20, 15 6, 1] and a high-pass filter having filter coefficients [1, −6, 15, −20, 15−6, 1]. However, the sub-band image of the $(M+1)^{th}$ level generated in step S310 is not limited to the LH sub-band and may alternatively be selected as HL sub-band image or the HH sub-band. The choice of the particular sub-band may be based on the expected shape or orientation of the road marker in the image captured by the camera. In the present example, the road marker 1410 in the image is a Botts' dot which, as illustrated in FIG. 14A, appears as a substantially ellipsoidal object that is elongated in the horizontal (x-) direction in the image. Therefore, applying a high-pass filter along the columns of the LL sub-band image of the $4^{th}$ level to generate the LH sub-band image of the $3^{rd}$ level serves to highlight the horizontal features in the input image and, at the same time, removes the low-frequency components corresponding to the unoccupied road area, so that the road marker 1410 appear as a bright object 1420 in the LH sub-band image of FIG. 14B. As such, the LH sub-band image is particularly suitable determining the location of a Botts' dot.

In the present example, in step S320 of the FIG. 13, the road marker determination module 20 upscales, by a factor of 4, the boundary of the region representing the unoccupied road area that is found using the LH sub-band of the $5^{th}$ DWT level (in step S30 of FIG. 4), in order to generate the upscaled boundary that is then mapped to the LH sub-band image of the $3^{rd}$ level (that is generated at step S310 of FIG. 13). The boundary of the region (representative of the unoccupied road area) in the LH sub-band of the $5^{th}$ level may, as in the present example, be upscaled by multiplying the x- and y-coordinates of the pixels defining the boundary by a factor of 4. The upscaled boundary that is mapped onto the LH sub-band image of the $3^{rd}$ level defines a search area within which the search for the boundary of the region of indicative of the boundary of the road marker is to be performed.

FIG. 14B illustrates the upscaled boundary 1430, which is obtained by up-scaling the coordinates of the boundary found at the LH sub-band of the $5^{th}$ level and mapping the upscaled boundary onto the LH sub-band of the $3^{rd}$ DWT level. In addition, in FIG. 14B, a search area 1440 is defined as region of the LH sub-band image that lies within the upscaled boundary 1430. It should be noted that, although the search area 1440 in the present example is defined by directly up-scaling the boundary found using the LH sub-band of the $5^{th}$ level, in some embodiments, the upscaled boundary 1430 may be further refined or expanded by the refined boundary data generator module 16 in accordance with steps described above with reference to FIG. 11. The refined, upscaled boundary may then be used to define the search area in the LH sub-band image of the $3^{rd}$ level.

In step S330 of FIG. 13, the road marker determination module 20 may, as in the present example, determine the boundary of the region in the $3^{rd}$ level LH sub-band image that is indicative of the boundary of the road marker by using a similar approach to the methods described in relation to step S30 of FIG. 4 for determining the boundary of the region representative of the unoccupied road area. More specifically, in step S30 of FIG. 4, a boundary is determined around a substantially dark region of the $5^{th}$ level LH sub-band image. In contrast, each road marker 1410 in the input image is represented by a substantially brighter region/spot 1420 in the $3^{rd}$ level LH sub-band image. Therefore, the algorithm described herein with reference to FIG. 7A can be easily adapted to detect a boundary in the LH sub-band image of the $3^{rd}$ level that is indicative of a road marker boundary.

More specifically, in the present example, determining the boundary indicative of the boundary of the road marker in step S330 is performed by the road marker determination module 20 first determining, within the area of the $3^{rd}$ level LH sub-band image that lies within the upscaled boundary, a pixel location of a pixel of the LH sub-band image of the $3^{rd}$ level whose pixel value exceeds a predetermined pixel threshold. The determination of this pixel location may be done iteratively by checking each pixel of the LH sub-band image until a pixel whose pixel value falls below the predetermined pixel threshold is determined. Upon determining the pixel location, the road marker determination module 20 further executes a contour tracing algorithm using the determined pixel location to identify the boundary a region that indicative of the road marker boundary. In particular, the boundary of the region separates pixels of the region which are adjacent to the boundary and have pixel values above the predetermined pixel threshold, from pixels outside the boundary which are adjacent to the boundary and have pixel values above the predetermined threshold. Any suitable boundary/contour tracing algorithm may be used in this regard, such as for example, the Moore-neighbour-tracing, the radial sweep and the square tracing algorithm.

In some embodiments, upon determining from the LH sub-band image of the $3^{rd}$ level, the boundary indicative of the road marker boundary, the road marker determination module 20 may further define a boundary of the road marker region in the input image that has been acquired by the camera. In particular, the road marker determination module 20 may up-scale the boundary indicative of the road marker region in the LH sub-band of the $3^{rd}$ level by a factor of 8 (corresponding to the different in scale between the resolution of the original image of the road and the resolution of the LH sub-band of the $3^{rd}$ level) to generate an up-scaled road marker boundary, which is then mapped onto the image as the defined boundary of the road marker region.

The road marker determination module 20 may further be arranged to determine whether a portion of the image within the defined boundary of the road marker region represents the road marker on the road. For example, the road marker determination module 20 may correlate the portion of the image within the defined boundary of the road marker region with one or more stored images of a road marking. Alternatively, the road marker determination module 20 may input the portion of the image within the defined boundary of the road marker region into a trained statistical classifier, such as a convolutional neural network (CNN), for example.

In some embodiments, non-linear pre-processing may be performed to normalise the $3^{rd}$ level LH sub-band image before determining the boundary indicative of the road marker boundary. More specifically, the road marker determination module 20 may be arranged to apply a scaling factor to the pixel value of each pixel of the LH sub-band image and saturate scaled pixel values that are above a pixel saturation threshold, before generating the boundary in the $3^{rd}$ level LH sub-band image that is indicative of the boundary of the road marker region in the image. For example, the scaling factor may be multiplied with the pixel value of each pixel of the $3^{rd}$ level LH sub-band image and the scaled pixel value may be converted into an 8-bit grey-scale value, such that scaled pixel values that are above 255 are saturated. The process of scaling followed by saturation has the effect of normalizing the LH sub-band image and improving its contrast, thus making the subsequent boundary determination process more robust to varying lighting conditions (i.e. varying contrast, brightness, and noise). In addition, the normalization can be achieved efficiently by simple multiplication operations, which is more computationally efficient than if non-linear filters were used to perform the normalization.

Furthermore, in some embodiments, the road marker determination module 20 may be arranged to apply a binary thresholding operation to the LH sub-band image of the $3^{rd}$ level before determining the boundary of the region the LH sub-band image that is representative of the boundary of the road marker region. Applying a binary thresholding operation to the LH sub-band image may allow the bright regions corresponding the road marker regions to be more accurately determined from the LH sub-band image.

It should be noted that, although the boundary found in the LH sub-band of the $3^{rd}$ level is upscaled to the input image in the present example, the boundary may alternatively be upscaled to a sub-band of the $1^{st}$ level or any DWT level higher than the level at which the boundary indicative of the road marker boundary is initially found.

In embodiments having both the refined boundary data generator module 16 and the road marker determination module 20 shown in FIG. 1, and wherein the value of P in step S110 of FIG. 11 is the same as the value of M in step S310 of FIG. 13, then step S310 does not need to be performed again if step S110 of FIG. 11 has already been performed. Instead, the output of step S110 may be reused as the output of step S310.

It should be noted that, although the road marker determination module 20 in the present embodiment makes use of a boundary found from an LH sub-band image of the $5^{th}$ level in order to define a search area in an LH sub-band image of the $3^{rd}$ level, in some embodiments, the road marker determination module 20 may directly search for the boundary indicative of the boundary of the road marker region in the LH sub-band image of the $3^{rd}$ level, without initially defining a search area using the boundary (representing the boundary of the unoccupied road area) that is found in the LH sub-band image of the $5^{th}$ level.

That is, in some embodiments, the road marker determination module 20 may function as a stand-alone image data processor that functions independently of the unoccupied road area determination module 10 in FIG. 1. When operating independently, the road marker determination module 20 may be arranged to process an image of a scene including a road having a road marker, which has been acquired by a camera mounted on a vehicle, to generate boundary data indicative of a boundary of a road marker region of the image which represents the road marker.

In particular, the road marker determination module 20, when functioning as a stand-alone image data processor, comprises a discrete wavelet transform (DWT) decomposition module that is arranged to generate an LL sub-band image of an $M^{th}$ level of an (M+1)-level discrete wavelet transform, DWT, decomposition of the image by performing an iterative process of iteratively low-pass filtering and down-sampling the image M times, where M is an integer equal to or greater than one. The DWT decomposition module is further arranged to generate a sub-band image of an $(M+1)^{th}$ level of the (M+1) level DWT decomposition of the image by high-pass filtering the LL sub-band image of the $M^{th}$ level, and down-sampling a result of the high-pass filtering. In addition, the road marker determination module further comprises a boundary data generator module that is arranged to generate the boundary data by determining a boundary of a region of pixels of the sub-band image of the $(M+1)^{th}$ level. The region of pixels is surrounded by pixels of substantially different pixel values to the pixel values of the pixels in the region. The boundary of the region is indicative of the boundary of the road marker region in the image of the road.

The DWT decomposition module of the road marker determination module 20 (when functioning as a stand-alone image data processor) may be arranged to generate the LL sub-band image of the $M^{th}$ level in the same manner that the DWT decomposition module 12 of the unoccupied road area determination module 10 is configured to generate its LL sub-band image of the $N^{th}$ level. Furthermore, the DWT decomposition module of the road marker determination module 20 (when functioning as a stand-alone image data processor) may be configured to generate the sub-band image of the $(N+1)^{th}$ level in the same manner that the DWT decomposition module 12 of the unoccupied road area determination module 10 is arranged to generate its sub-band image of the $(N+1)^{th}$ level. All embodiments, examples and variations described in relation to steps S10 and S20 in FIG. 4 are also applicable to the DWT decomposition module of the road marker determination module 20 (when functioning as a stand-alone image data processor). Furthermore, the boundary data generator module of the road marker determination module 20 (when functioning as a stand-alone image data processor) may be arranged to generate the boundary data indicative of the boundary of the road marker region by using the same method as described above, in step S330 of FIG. 13.

Furthermore, all embodiments and variants previously described in relation to the road marker determination module 20 in FIG. 1 are embodiments and variants of a road marker determination module 20 that functions as a stand-alone image data processor, with the only difference being that the boundary indicative of the boundary of the road marker region is determined in the sub-band image of the $(M+1)^{th}$ level without defining a search area in the sub-band image of the $(M+1)^{th}$ level using a boundary found from a lower level sub-band image.

Embodiments described above are summarised in the following numbered clauses E1 to E39:

E1. A method of processing an image (910) of a scene including a road that has been acquired by a camera mounted on a vehicle to generate boundary data indicative of a boundary of a region of the image which represents an unoccupied area of the road, the method comprising:
generating (S10) an LL sub-band image (920) of an $N^{th}$ level of an (N+1)-level discrete wavelet transform, DWT, decomposition of the image (910) by performing an iterative process of iteratively low-pass filtering and down-sampling the image N times, where N is an integer equal to or greater than one;
generating (S20) a sub-band image (930) of an $(N+1)^{th}$ level of the (N+1) level DWT decomposition of the image by high-pass filtering the LL sub-band image of the $N^{th}$ level, and down-sampling a result of the high-pass filtering, such that the sub-band image (930) of the $(N+1)^{th}$ level has a region (932) of pixels having substantially equal pixel values, which represents the unoccupied area of the road in the image (910); and
generating (S30) the boundary data by determining a boundary (931) of the region (932) of pixels.

E2. The method according to E1, wherein a first low-pass filter (310) having a first sequence of filter coefficients (510) that are symmetrical is used in at least one iteration of the iterative process.

E3. The method according to E2, wherein the filter coefficients in the first sequence of filter coefficients (510) are set to values in a row of Pascal's triangle having the same number of values as an order of the first low-pass filter (310).

E4. The method according to E2 or E3, wherein the high-pass filtering used to generate the sub-band image (930) of the $(N+1)^{th}$ level comprises applying a high-pass filter (320) having a second sequence of filter coefficients (520) that are symmetrical.

E5. The method according to E4, wherein:
alternate filter coefficients in the second sequence of filter coefficients (520) are set to correspondingly located values in a row of Pascal's triangle having the same number of values as an order of the high-pass filter (320); and
each remaining filter coefficient in the second sequence of filter coefficients (520) is set to a value obtained by multiplying a correspondingly located value in the row of Pascal's triangle by −1.

E6. The method according to any one of E1 to E5, wherein the sub-band image (930) of the $(N+1)^{th}$ level of the (N+1)-level DWT decomposition is one of an LH sub-band image, an HL sub-band image, and an HH sub-band image.

E7. The method according to any one of E1 to E6, wherein generating the sub-band image (930) of the $(N+1)^{th}$ level of the (N+1)-level DWT decomposition of the image (910) comprises generating an LH sub-band image of the $(N+1)^{th}$ level of the (N+1)-level DWT decomposition of the image (910) by:
generating a low-pass filtered LL sub-band image by applying a row kernel which defines a low-pass filter (310) across the rows of the LL sub-band image of the $N^{th}$ level of the (N+1)-level DWT decomposition of the image (910);
down-sampling the columns of the low-pass filtered LL sub-band image by a factor of two to generate a down-sampled sub-band image;
generating a high-pass filtered LL sub-band image by applying a column kernel which defines a high-pass filter (320) across the columns of the down-sampled sub-band image; and
down-sampling the rows of the high-pass filtered LL sub-band image by a factor of two to generate the LH sub-band image of the $(N+1)^{th}$ level.

E8. The method according to any one of E1 to E6, wherein generating the sub-band image (930) of the $(N+1)^{th}$ level of the (N+1)-level DWT decomposition of the image comprises generating an LH sub-band image of the $(N+1)^{th}$ level of the DWT decomposition of the image (910) by:
generating a high-pass filtered LL sub-band image by applying a column kernel which defines a high-pass filter (320) across the columns of the LL sub-band image of the $N^{th}$ level;
down-sampling the rows of the high-pass filtered LL sub-band image by a factor of two to generate a down-sampled sub-band image;
generating a low-pass filtered sub-band image by applying a row kernel which defines a low-pass filter (310) across the rows of the down-sampled sub-band image of the $N^{th}$ level; and down-sampling the columns of the low-pass filtered sub-band image by a factor of two to generate the LH sub-band image of the $(N+1)^{th}$ level.

E9. The method according to any one of E1 to E6, wherein generating the sub-band image (930) of the $(N+1)^{th}$ level comprises generating an LH sub-band image of the $(N+1)^{th}$ level of the (N+1)-level DWT decomposition of the image (910) by:
  generating a filtered sub-band image by applying a two-dimensional kernel across the LL sub-band image of the $N^{th}$ level, the two-dimensional kernel being separable into a product of a row kernel and a column kernel, the row-kernel defining a low-pass filter and the column kernel defining a high pass filter; and
  down-sampling rows and the columns of the filtered sub-band image by a factor of two.

E10. The method according to any one of E7 to E9, wherein the low-pass filter (310) and the high-pass filter (320) used to generate the LH sub-band image of the $(N+1)^{th}$ level of the (N+1)-level DWT decomposition of the image (910) define a quadrature mirror filter pair.

E11. The method according to any one of E7 to E10, wherein the low-pass filter (310) used to generate the LH sub-band image of the $(N+1)^{th}$ level of the (N+1)-level DWT decomposition of the image (910) has a third sequence of filter coefficients (510) that are symmetrical.

E12. The method according to E11, wherein the filter coefficients in the third sequence of filter coefficients (510) are set to values in a row of Pascal's triangle having the same number of values as an order of the low-pass filter (310) used to generate the LH sub-band image of the $(N+1)^{th}$ level of the (N+1)-level DWT decomposition of the image (910).

E13. The method according to any one of E1 to E12, wherein no more than two sub-band images are generated in each level of the (N+1)-level DWT decomposition of the image up to the $N^{th}$ level, and wherein only the sub-band image (930) is generated at the $(N+1)^{th}$ level of the (N+1)-level DWT decomposition of the image E14. The method according to any one of E1 to E13, wherein the method processes the image (910) of the scene as acquired by the camera.

E15. The method according to any one of E1 to E14, wherein N is an integer greater than or equal to four.

E16. The method according to any one of E1 to E15, further comprising setting N to a value that is based on an image resolution of the image (910), by using a predetermined mapping between values of the image resolution and values of N.

E17. The method according to any one of E1 to E16, wherein generating the boundary data comprises determining the boundary (931) of the region (932) of the sub-band image (930) by:
  determining a pixel location of a pixel of the sub-band image (930) of the $(N+1)^{th}$ level whose pixel value falls below a predetermined threshold;
  executing a contour tracing algorithm using the determined pixel location to identify the boundary (931) of the region (932) of the sub-band image of the $(N+1)^{th}$ level, wherein the boundary separates pixels of the region (932) which are adjacent to the boundary and have pixel values below the predetermined threshold, from pixels outside the boundary which are adjacent to the boundary and have pixel values above the predetermined threshold.

E18. The method according to any one of E1 to E17, wherein the boundary data is generated by determining the boundary (931) of the region (932) of the sub-band image (930) by:
  determining, for each of a plurality of columns (805) of pixels in the sub-band image (930), a pixel location (806, 807) of a pixel in the column (805) at which a difference between a pixel value of the pixel and a pixel value of an adjacent pixel in the column exceeds a predetermined threshold; and
  defining line segments (820) in the sub-band image (930) using the determined pixel locations (806, 807), the line segments (820) defining the boundary (931) of region of the sub-band image (930).

E19. The method according to E18, wherein a pixel location (806, 807) of a pixel in the column, at which a difference between a pixel value of the pixel and a pixel value of an adjacent pixel which is above the pixel in the column (805, 840) exceeds a predetermined threshold, is determined for each of the plurality of columns (805 840) of pixels in the sub-band image (930) by evaluating the difference for successive pixels in the column (805, 840), starting from a pixel at a bottom of the column (805, 840).

E20. The method according to any one of E1 to E19, wherein the camera is configured to acquire, as the image (910), an image of a scene including the road and a portion of the sky, and the method excludes from the processing a portion of the image (910) representing the portion of the sky.

E21. The method according to any one of E1 to E20, further comprising applying a scaling factor to the pixel value of each pixel of the sub-band image (930) and saturating scaled pixel values that are above a pixel saturation threshold, before generating the boundary data.

E22. The method according to any one of E1 to E21, wherein N is an integer equal to or greater than two, and the method further comprises generating refined boundary data, which is indicative of the boundary of the region of the image (910) which represents the unoccupied area of the road, by:
  high-pass filtering (S110) an LL sub-band image of a $P^{th}$ level of the (N+1)-level DWT decomposition of the image and down-sampling a result of the high-pass filtering of the LL sub-band image of the $P^{th}$ level to generate a second sub-band image which is a sub-band image of a $(P+1)^{th}$ level of the (N+1)-level DWT decomposition of the image, where P is an integer smaller than N;
  determining (S120) a second boundary, in the second sub-band image, by up-scaling the determined boundary of the region of the sub-band image of the $(N+1)^{th}$ level using a scaling factor of $2^T$, where T=N−P, to generate an up-scaled boundary, and mapping the up-scaled boundary to the second sub-band image; and
  processing (S130) the second sub-band image using the determined second boundary to generate, as the refined boundary data, data indicative of a boundary of a second region in the second sub-band image which contains the second boundary and represents the unoccupied area of the road in the image (910).

E23. The method according to E22, wherein the data indicative of the boundary of the second region is generated by expanding the determined second boundary to further bound at least one region in the second sub-band image which is defined by adjacent pixels having substantially equal pixel values.

E24. The method according to E22 or E23, wherein the data indicative of the boundary of the second region is generated by:
- determining (S210) a cluster of adjacent pixels in the second sub-band image which crosses the second boundary, the pixels in the cluster having substantially equal pixel values;
- generating (S220) image data of an up-scaled sub-band image having the same image size as the second sub-band image, by up-scaling a portion of the sub-band image of the $(N+1)^{th}$ level by the scaling factor of $2^T$, wherein the portion of the sub-band image of the $(N+1)^{th}$ that is up-scaled is determined based on the locations of the pixels of the cluster in the second sub-band image, and a mapping between a location of each pixel of the second sub-band image and a location of a pixel of sub-band image of the $(N+1)^{th}$ level;
- evaluating (S230) a statistic of pixels in the up-scaled portion of the sub-band image of the $(N+1)^{th}$ level, and comparing the evaluated statistic with a predetermined value; and
- determining (S240), based on the comparison between the evaluated statistic and the predetermined value, whether to expand the second boundary to further bound the cluster of adjacent pixels in the second sub-band image.

E25. The method according to E24, wherein evaluating the statistic of the pixels in the up-scaled portion of the sub-band image of the $(N+1)^{th}$ level comprises evaluating at least one of:
- a proportion of pixels in the up-scaled portion of the sub-band image of the $(N+1)^{th}$ level whose pixel values are below a second predetermined value;
- a mean of pixel values in the up-scaled portion of the sub-band image of the $(N+1)^{th}$ level; and
- a variance of pixel values in the up-scaled portion of the sub-band image of the $(N+1)^{th}$ level.

E26. The method according to any one of E22 to E25, further comprising applying a binary thresholding operation to the second sub-band image before generating the refined boundary data.

E27. The method according to any one of E22 to E26, further comprising applying a scaling factor to the pixel value of each pixel of the second sub-band image and saturating scaled pixel values that are above a pixel saturation threshold before generating the refined boundary data.

E28. The method according to any one of E24 to E27, wherein the camera is configured to acquire, as the image, an image of a scene including the road and a horizon, and wherein the determination of whether to expand the second boundary to further bound the cluster of adjacent pixels in the second sub-band image is further based on a distance of the cluster from the horizon in the second sub-band image.

E29. The method according to any one of E22 to E28, wherein the camera is configured to generate a distorted image of the scene, and the method further comprises generating occupancy map data indicative of an occupancy map of the road, by applying a distortion correction to the refined boundary data.

E30. The method according to any one of E1 to E29, wherein N is an integer equal to or greater than two, the road in the scene has a road marker, and the method further comprises generating boundary data indicative of a boundary of a road marker region (1410) of the image (910) which represents the road marker, by
- high-pass filtering (S320) an LL sub-band image of a $M^{th}$ level of the (N+1)-level DWT decomposition of the image (910) and down-sampling a result of the high-pass filtering of the LL sub-band image of the $M^{th}$ level to generate a sub-band image (1415) of a $(M+1)^{th}$ level of the DWT decomposition, M being an integer less than N;
- determining (S320) a search area (1440) in the sub-band image (1415) of the $(M+1)^{th}$ level by up-scaling the boundary (931) determined from the sub-band image (930) of the $(N+1)^{th}$ level by a factor of $2^D$ for D=N−M, and mapping the up-scaled boundary (1430) to the sub-band image (1415) of the $(M+1)^{th}$ level, wherein the search area (1440) lies within the up-scaled boundary (1430) that is mapped onto the sub-band image (1415) of the $(M+1)^{th}$ level; and
- determining (S330), within the search area (1440) in the sub-band image (1415) of the $(M+1)^{th}$ level, a boundary of a second region (1420) of pixels of the sub-band image of the $(M+1)^{th}$ level, the second region (1420) of pixels being surrounded by pixels having pixel values that are substantially different to the pixel values of the pixels in the second region (1420), the boundary of the second region (1420) being indicative of the boundary of the road marker region (1410) in the image (910).

E31. The method according to E30, wherein the LL sub-band image of the $M^{th}$ level of the (N+1)-level DWT decomposition of the image (910) is generated using at least one first low-pass filter (310) having a first sequence of filter coefficients (510) that are symmetrical and set to values in a row of Pascal's triangle having the same number of values as an order of the first low-pass filter (310).

E32. The method according to E30 or E31, wherein
- the high-pass filtering to generate the sub-band image (1415) of the $(M+1)^{th}$ level of the (N+1)-level DWT decomposition of the image (910) comprises applying a high-pass filter (320) having a second sequence of filter coefficients (520) that are symmetrical,
- alternate filter coefficients in the second sequence of filter coefficients (520) of the high-pass filter (320) are set to correspondingly located values in a row of
- Pascal's triangle having the same number of values as an order of the high-pass filter (320), and
- each remaining filter coefficient in the second sequence of filter coefficients (520) is set to a value obtained by multiplying a correspondingly located value in the row of Pascal's triangle by −1.

E33. The method according to any one of E30 to E32, wherein the sub-band image (1415) of the $(M+1)^{th}$ level of the (N+1)-level DWT decomposition is one of an LH sub-band image, an HL sub-band image, and an HH sub-band image.

E34. The method according to E33, wherein the road marker (1410) is a Botts' dot, and the sub-band image (1415) of the $(M+1)^{th}$ level of the (N−1)-level DWT decomposition is an LH sub-band image of the $(M+1)^{th}$ level of the (N+1)-level DWT decomposition.

E35. The method according to any one of E30 to E34, wherein generating the boundary data comprises:
- determining, within the search area (1440), a pixel location of a pixel whose pixel value exceeds a predetermined threshold;
- executing a contour tracing algorithm using the determined pixel location in the search area (1440) to identify a boundary of the second region (1420) of pixels, wherein the boundary separates pixels of the second region (1420) which are adjacent to the boundary and have pixel values above the predetermined threshold, from pixels outside the second region (1420) which are adjacent to the boundary and have pixel values below the predetermined threshold.

E36. The method according to any one of E30 to E35, further comprising:
defining a boundary of the road marker region (1410) in the image (910) by:
up-scaling the boundary of the second region (1420) of pixels by a factor of $2^{M+1}$ to generate a second up-scaled boundary; and
mapping the second up-scaled boundary to the image (910).

E37. The method according to E36, further comprising determining whether a portion of the image (910) within the defined boundary of the road marker region (1420) represents the road marker on the road by:
correlating the portion of the image (910) within the defined boundary of the road marker region (1410) with one with more stored images of a road marking; or
using a trained statistical classifier.

E38. A computer program (245) comprising computer-readable instructions which, when executed by a processor (220), cause the processor (220) to execute a method according to at least one of E1 to E37.

E39. An apparatus (1) for processing an image (910) of a scene including a road that has been acquired by a vehicle-mounted camera to generate boundary data indicative of a boundary of a region of the image which represents an unoccupied area of the road, the apparatus (1) comprising:
a discrete wavelet transform, DWT, decomposition module (12) arranged to:
generate an LL sub-band image of an $N^{th}$ level of an (N+1)-level discrete wavelet transform, DWT, decomposition of the image (910) by iteratively low-pass filtering and down-sampling the image (910) N times, where N is an integer equal to or greater than one; and
generate a sub-band image (930) of an $(N+1)^{th}$ level of the (N+1) level DWT decomposition of the image (910) by high-pass filtering the LL sub-band image of the $N^{th}$ level, and down-sampling a result of the high-pass filtering, such that the sub-band image (930) of the $(N+1)^{th}$ level has a region of pixels having substantially equal pixel values, which represents the unoccupied area of the road in the image (910); and
a boundary data generator module (14) arranged to generate the boundary data by determining a boundary (931) of the region (932) of pixels.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The invention claimed is:

1. A method of processing an image of a scene including a road that has been acquired by a camera mounted on a vehicle to generate boundary data indicative of a boundary of a region of the image which represents an unoccupied area of the road, the method comprising:
   generating an LL sub-band image of an $N^{th}$ level of an (N+1)-level discrete wavelet transform, DWT, decomposition of the image by performing an iterative process of iteratively low-pass filtering and down-sampling the image N times, where N is an integer equal to or greater than one;
   generating a sub-band image of an $(N+1)^{th}$ level of the (N+1) level DWT decomposition of the image by high-pass filtering the LL sub-band image of the $N^{th}$ level, and down-sampling a result of the high-pass filtering, such that the sub-band image of the $(N+1)^{th}$ level has a region of pixels which represents the unoccupied area of the road in the image; and
   generating the boundary data by determining a boundary of the region of pixels,
   wherein the boundary data is generated by determining the boundary of the region of the sub-band image by:
   determining, for each of a plurality of columns of pixels in the sub-band image, a pixel location of a pixel in the column at which a difference between a pixel value of the pixel and a pixel value of an adjacent pixel in the column exceeds a predetermined threshold; and
   defining line segments in the sub-band image using the determined pixel locations, the line segments defining the boundary of region of the sub-band image.

2. The method according to claim 1, wherein a first low-pass filter having a first sequence of filter coefficients that are symmetrical is used in at least one iteration of the iterative process.

3. The method according to claim 2, wherein the filter coefficients in the first sequence of filter coefficients are set to values in a row of Pascal's triangle having the same number of values as an order of the first low-pass filter.

4. The method according to claim 1, wherein the high-pass filtering used to generate the sub-band image of the $(N+1)^{th}$ level comprises applying a high-pass filter having a second sequence of filter coefficients that are symmetrical.

5. The method according to claim 4, wherein:
   alternate filter coefficients in the second sequence of filter coefficients are set to correspondingly located values in a row of Pascal's triangle having the same number of values as an order of the high-pass filter; and
   each remaining filter coefficient in the second sequence of filter coefficients is set to a value obtained by multiplying a correspondingly located value in the row of Pascal's triangle by −1.

6. The method according to claim 1, wherein the sub-band image of the $(N+1)^{th}$ level of the (N+1)-level DWT decomposition is one of an LH sub-band image, an HL sub-band image, and an HH sub-band image.

7. The method according to claim 1, wherein generating the sub-band image of the $(N+1)^{th}$ level of the (N+1)-level DWT decomposition of the image comprises generating an LH sub-band image of the $(N+1)^{th}$ level of the (N+1)-level DWT decomposition of the image by one of:
   a first process comprising:
      generating a low-pass filtered LL sub-band image by applying a row kernel which defines a low-pass filter across the rows of the LL sub-band image of the $N^{th}$ level of the (N+1)-level DWT decomposition of the image;
      down-sampling the columns of the low-pass filtered LL sub-band image by a factor of two to generate a down-sampled sub-band image;
      generating a high-pass filtered LL sub-band image by applying a column kernel which defines a high-pass filter across the columns of the down-sampled sub-band image; and down-sampling the rows of the high-pass filtered LL sub-band image by a factor of two to generate the LH sub-band image of the $(N+1)^{th}$ level;

a second process comprising:
generating a high-pass filtered LL sub-band image by applying a column kernel which defines a high-pass filter across the columns of the LL sub-band image of the $N^{th}$ level;
down-sampling the rows of the high-pass filtered LL sub-band image by a factor of two to generate a down-sampled sub-band image;
generating a low-pass filtered sub-band image by applying a row kernel which defines a low-pass filter across the rows of the down-sampled sub-band image of the $N^{th}$ level; and
down-sampling the columns of the low-pass filtered sub-band image by a factor of two to generate the LH sub-band image of the $(N+1)^{th}$ level; and a third process comprising:
generating a filtered sub-band image by applying a two-dimensional kernel across the LL sub-band image of the $N^{th}$ level, the two-dimensional kernel being separable into a product of a row kernel and a column kernel, the row-kernel defining a low-pass filter and the column kernel defining a high pass filter; and
down-sampling rows and the columns of the filtered sub-band image by a factor of two.

8. The method according to claim 1, wherein no more than two sub-band images are generated in each level of the $(N+1)$-level DWT decomposition of the image up to the $N^{th}$ level, and wherein only the sub-band image is generated at the $(N+1)^{th}$ level of the $(N+1)$-level DWT decomposition of the image.

9. The method according to claim 1, further comprising setting N to a value that is based on an image resolution of the image, by using a predetermined mapping between values of the image resolution and values of N.

10. The method according to claim 1, wherein generating the boundary data comprises determining the boundary of the region of the sub-band image by:
determining a pixel location of a pixel of the sub-band image of the $(N+1)^{th}$ level whose pixel value falls below a predetermined threshold; and
executing a contour tracing algorithm using the determined pixel location to identify the boundary of the region of the sub-band image of the $(N+1)^{th}$ level, wherein the boundary separates pixels of the region which are adjacent to the boundary and have pixel values below the predetermined threshold, from pixels outside the boundary which are adjacent to the boundary and have pixel values above the predetermined threshold.

11. The method according to claim 1, wherein N is an integer equal to or greater than two, and the method further comprises generating refined boundary data, which is indicative of the boundary of the region of the image which represents the unoccupied area of the road, by:
high-pass filtering an LL sub-band image of a $P^{th}$ level of the $(N+1)$-level DWT decomposition of the image and down-sampling a result of the high-pass filtering of the LL sub-band image of the $P^{th}$ level to generate a second sub-band image which is a sub-band image of a $(P+1)^{th}$ level of the $(N+1)$-level DWT decomposition of the image, where P is an integer smaller than N;
determining a second boundary, in the second sub-band image, by up-scaling the determined boundary of the region of the sub-band image of the $(N+1)^{th}$ level using a scaling factor of $2^T$, where $T=N-P$, to generate an up-scaled boundary, and mapping the up-scaled boundary to the second sub-band image; and
processing the second sub-band image using the determined second boundary to generate, as the refined boundary data, data indicative of a boundary of a second region in the second sub-band image which contains the second boundary and represents the unoccupied area of the road in the image.

12. The method according to claim 1, wherein N is an integer equal to or greater than two, the road in the scene has a road marker, and the method further comprises generating boundary data indicative of a boundary of a road marker region of the image which represents the road marker, by
high-pass filtering an LL sub-band image of a $M^{th}$ level of the $(N+1)$-level DWT decomposition of the image and down-sampling a result of the high-pass filtering of the LL sub-band image of the $M^{th}$ level to generate a sub-band image of a $(M+1)^{th}$ level of the DWT decomposition, M being an integer less than N;
determining a search area in the sub-band image of the $(M+1)^{th}$ level by up-scaling the boundary determined from the sub-band image of the $(N+1)^{th}$ level by a factor of $2^D$ for $D=N-M$, and mapping the up-scaled boundary to the sub-band image of the $(M+1)^{th}$ level, wherein the search area lies within the up-scaled boundary that is mapped onto the sub-band image of the $(M+1)^{th}$ level; and
determining, within the search area in the sub-band image of the $(M+1)^{th}$ level, a boundary of a second region of pixels of the sub-band image of the $(M+1)^{th}$ level, the boundary of the second region being indicative of the boundary of the road marker region in the image.

13. A non-transitory computer-readable medium storing instructions that, when executed by a processor, cause the processor to perform a method according to claim 1.

14. An apparatus for processing an image of a scene including a road that has been acquired by a vehicle-mounted camera to generate boundary data indicative of a boundary of a region of the image which represents an unoccupied area of the road, the apparatus comprising:
a processor; and
a memory, including instructions stored thereon, which when executed by the processor cause the apparatus to:
generate an LL sub-band image of an $N^{th}$ level of an $(N+1)$-level discrete wavelet transform, DWT, decomposition of the image by iteratively low-pass filtering and down-sampling the image N times, where N is an integer equal to or greater than one;
generate a sub-band image of an $(N+1)^{th}$ level of the $(N+1)$ level DWT decomposition of the image by high-pass filtering the LL sub-band image of the $N^{th}$ level, and down-sampling a result of the high-pass filtering, such that the sub-band image of the $(N+1)^{th}$ level has a region of pixels which represents the unoccupied area of the road in the image; and
generate the boundary data by determining a boundary of the region of pixels,
wherein the boundary data is generated by determining the boundary of the region of the sub-band image by:
determining, for each of a plurality of columns of pixels in the sub-band image, a pixel location of a pixel in the column at which a difference between a pixel value of the pixel and a pixel value of an adjacent pixel in the column exceeds a predetermined threshold; and defining line segments in the sub-band image using the determined pixel locations, the line segments defining the boundary of region of the sub-band image.

* * * * *